(12) United States Patent
Yee et al.

(10) Patent No.: US 8,444,265 B2
(45) Date of Patent: May 21, 2013

(54) EYEGLASS EARSTEM WITH ENHANCED PERFORMANCE

(75) Inventors: Peter Yee, Irvine, CA (US); Neil Ferrier, Foothill Ranch, CA (US); Steve Ogren, Yorba Linda, CA (US); Carlos Reyes, Rancho Santa Margarita, CA (US)

(73) Assignee: Oakley, Inc., Foothill Ranch, CA (US)

( * ) Notice: Subject to any disclaimer, the term of this patent is extended or adjusted under 35 U.S.C. 154(b) by 719 days.

(21) Appl. No.: 12/572,881

(22) Filed: Oct. 2, 2009

(65) Prior Publication Data

US 2011/0080556 A1    Apr. 7, 2011

(51) Int. Cl.
    *G02C 5/22*    (2006.01)
(52) U.S. Cl.
    USPC .......................... 351/113; 351/111; 351/114
(58) Field of Classification Search
    USPC .................. 351/113, 114, 153, 111, 41
    See application file for complete search history.

(56) References Cited

U.S. PATENT DOCUMENTS

| | | | | |
|---|---|---|---|---|
| 3,606,525 A | * | 9/1971 | Landree | 351/113 |
| 3,713,731 A | * | 1/1973 | Gardner | 351/113 |
| 3,762,805 A | * | 10/1973 | Lyons, Sr. | 351/113 |
| 3,923,384 A | * | 12/1975 | Leblanc | 351/113 |
| 4,618,226 A | * | 10/1986 | Sartor et al. | 351/113 |
| 5,059,017 A | | 10/1991 | Bennato | |
| 5,080,476 A | | 1/1992 | Monin | |
| 5,231,429 A | | 7/1993 | Kanda | |
| 5,359,370 A | | 10/1994 | Mugnier | |
| 5,555,037 A | | 9/1996 | Canavan | |
| 5,631,718 A | | 5/1997 | Markovitz et al. | |
| 5,666,181 A | | 9/1997 | Conway | |
| 5,673,095 A | | 9/1997 | Conway | |
| 5,708,489 A | | 1/1998 | Jannard | |
| 5,805,261 A | | 9/1998 | Houston et al. | |
| 5,835,185 A | | 11/1998 | Kallman et al. | |

(Continued)

FOREIGN PATENT DOCUMENTS

| | | |
|---|---|---|
| EP | 0950914 | 10/1999 |
| WO | WO 94/11774 | 5/1994 |
| WO | WO 2007/113396 | 10/2007 |

OTHER PUBLICATIONS

International Search Report and Written Opinion in International Application No. PCT/US2010/055496, dated Feb. 21, 2011 in 11 pages.

(Continued)

*Primary Examiner* — Hung Dang

(74) *Attorney, Agent, or Firm* — Knobbe Martens Olson & Bear, LLP

(57) ABSTRACT

An enhanced performance earstem for eyeglasses is provided that can incorporate one or more flex zones or points along the length of the earstem. In some embodiments, the earstem can comprise an elongate body having an anterior end and a posterior end and at least a first segment and a second segment on the body having a first flex zone or point disposed at least partially therebetween. A center of the first flex zone or point can be within a given range from the anterior end. Further, some embodiments can provide differential flexibility along the length of the earstem. For example, the body of the earstem can have plurality of relatively flexible zones, and each flexible zone can be separated from an adjacent flexible zone by a relatively rigid zone. In this regard, the relatively flexible zones can have different stiffnesses.

21 Claims, 18 Drawing Sheets

U.S. PATENT DOCUMENTS

| | | |
|---|---|---|
| 5,959,715 A | 9/1999 | Jaffelin |
| 5,987,702 A | 11/1999 | Simioni |
| 6,048,062 A | 4/2000 | Chow |
| 6,106,116 A | 8/2000 | Houston et al. |
| 6,145,985 A * | 11/2000 | De Marchi et al. ........... 351/153 |
| 6,231,181 B1 | 5/2001 | Swab |
| 6,250,756 B1 | 6/2001 | Jannard |
| 6,336,250 B1 | 1/2002 | Takeda et al. |
| 6,886,934 B2 | 5/2005 | Asman et al. |
| 7,210,776 B2 | 5/2007 | Jannard et al. |
| 7,367,669 B2 | 5/2008 | Jannard et al. |
| D584,335 S | 1/2009 | Baden et al. |
| 8,020,988 B2 | 9/2011 | Ogren et al. |
| D650,825 S | 12/2011 | Yee et al. |
| D652,442 S | 1/2012 | Yee et al. |
| 8,240,846 B2 | 8/2012 | Ogren et al. |

OTHER PUBLICATIONS

International Preliminary Report on Patentability in International Application No. PCT/US2010/055496, dated May 18, 2012 in 7 pages.

* cited by examiner

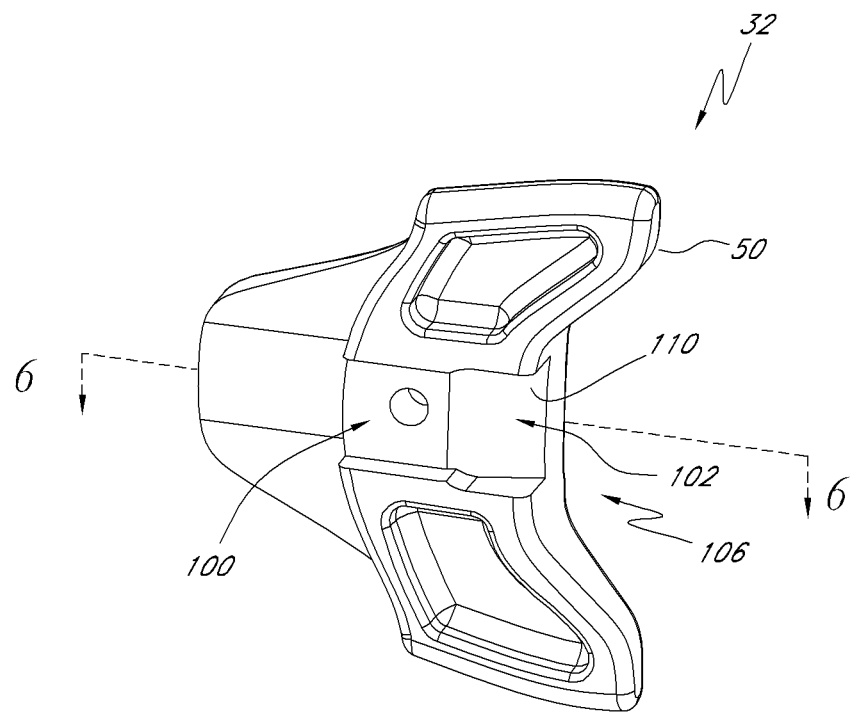
FIG. 4
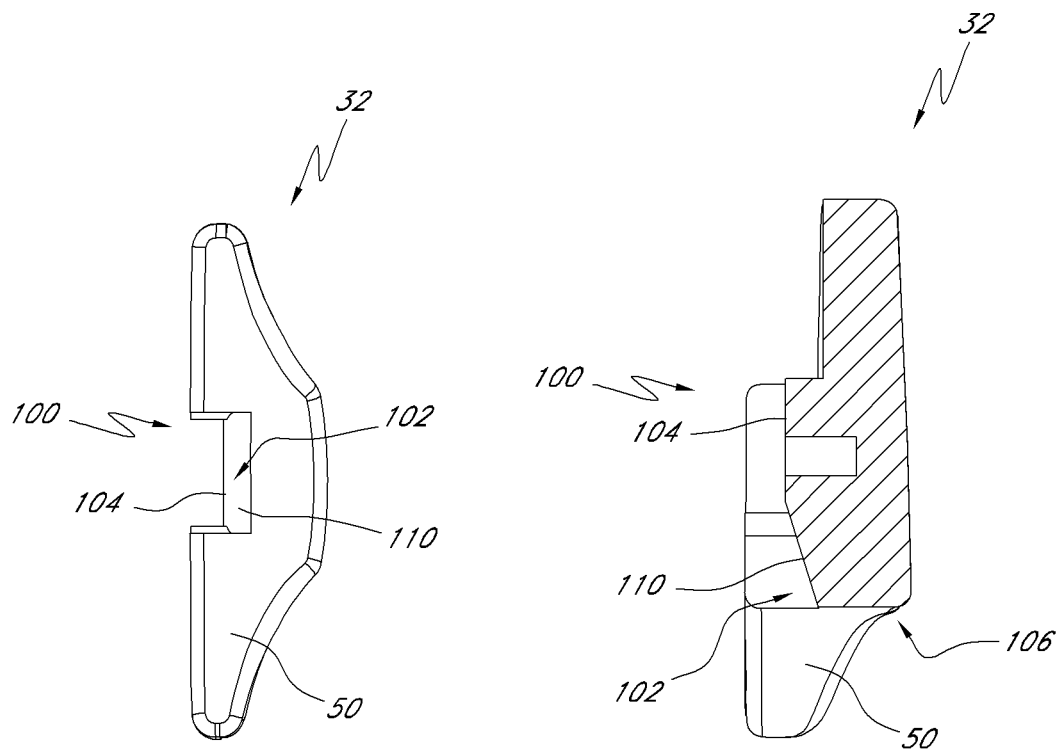
FIG. 5
FIG. 6

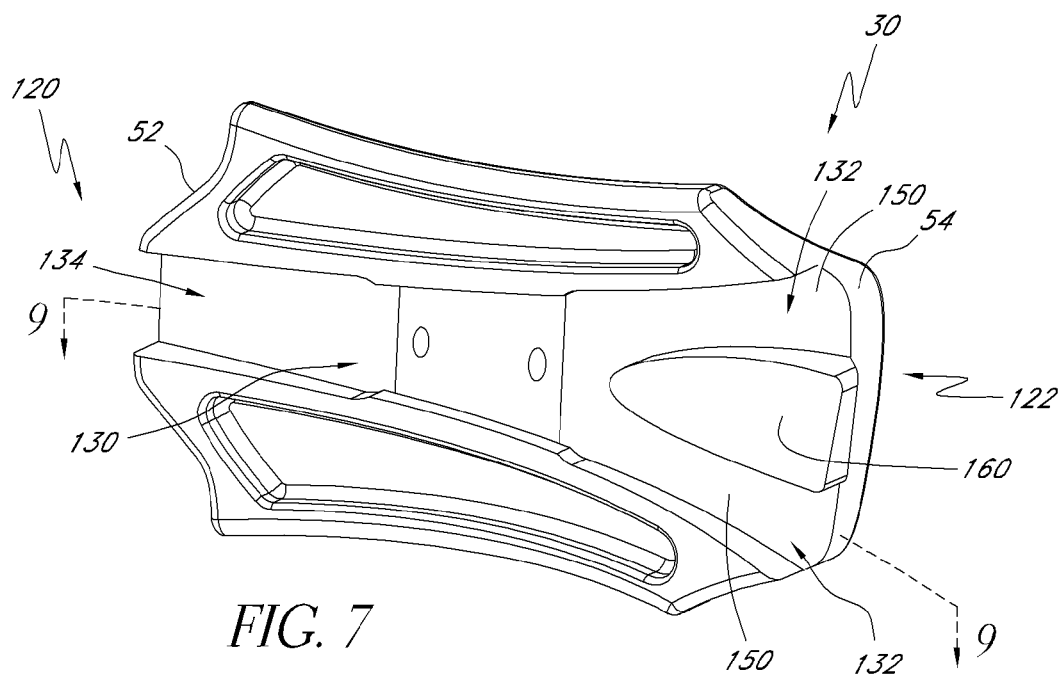
FIG. 7
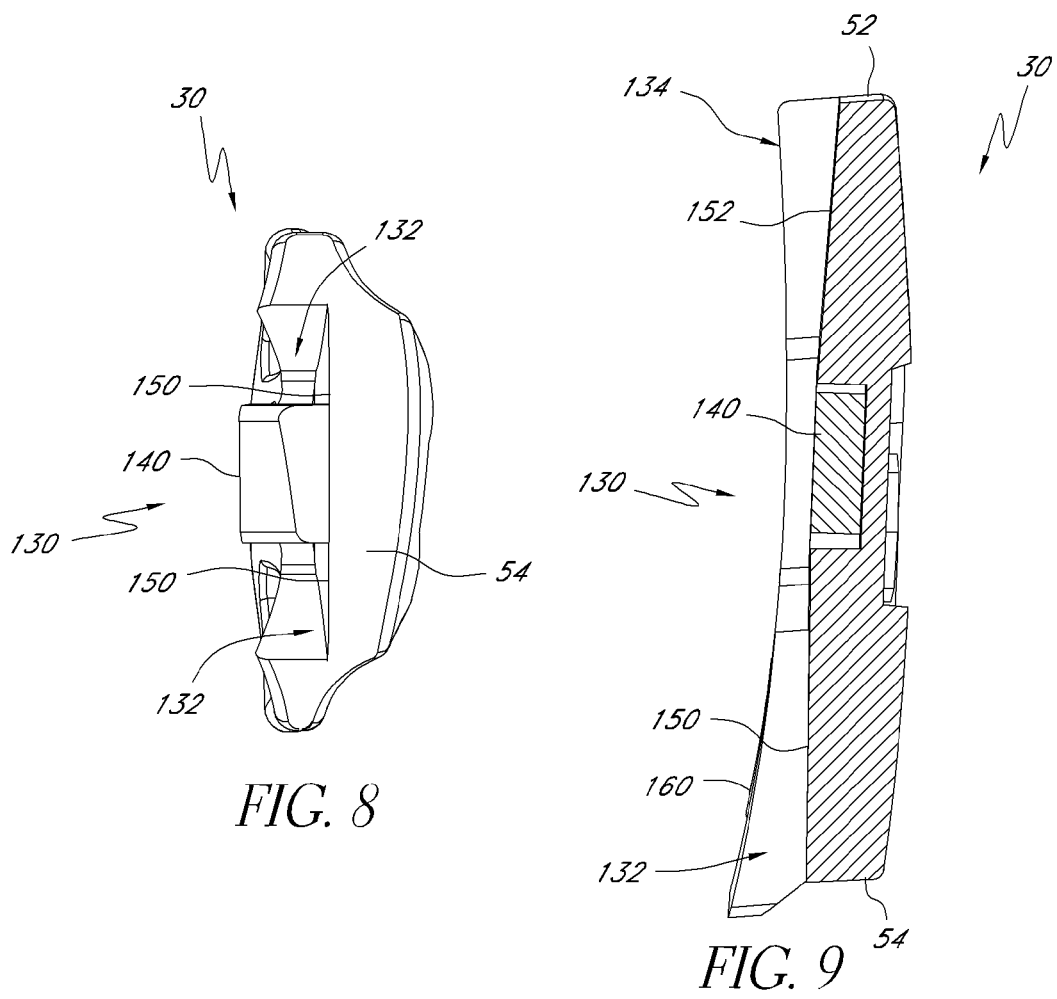
FIG. 8
FIG. 9

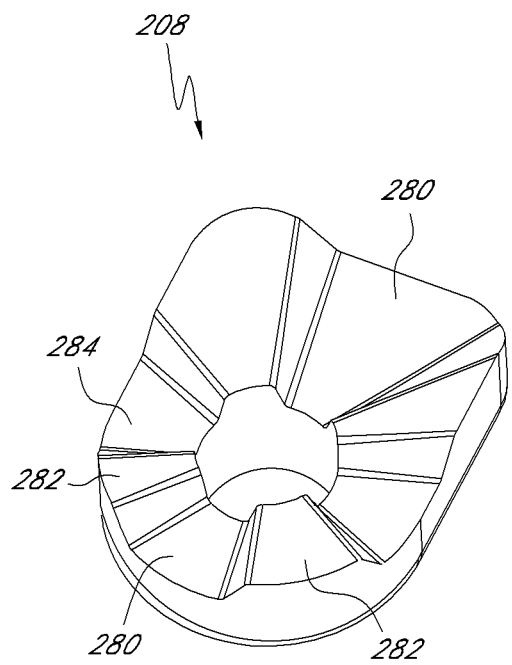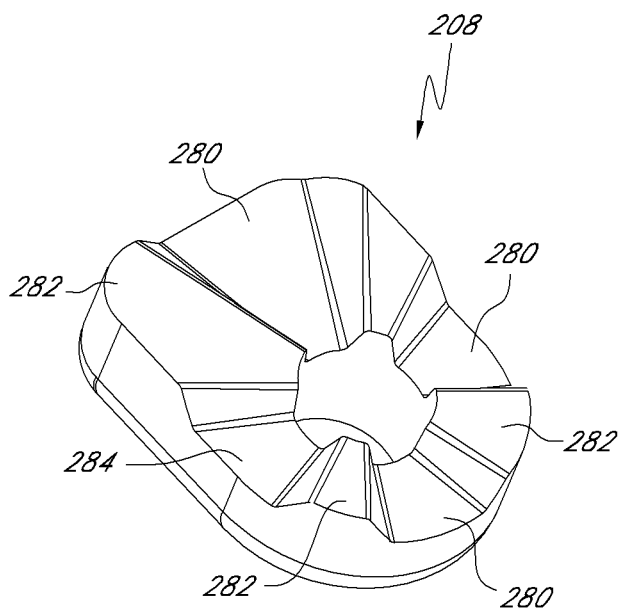
FIG. 16  FIG. 17
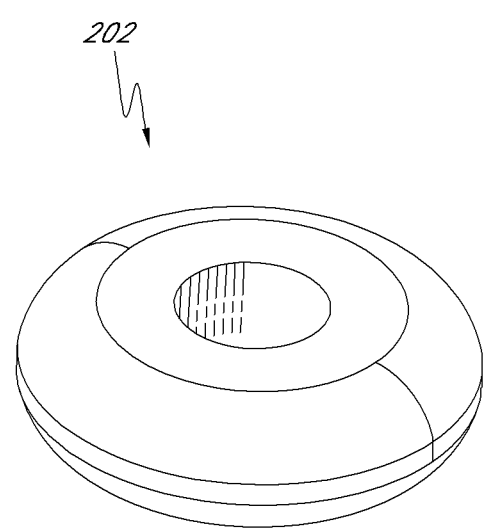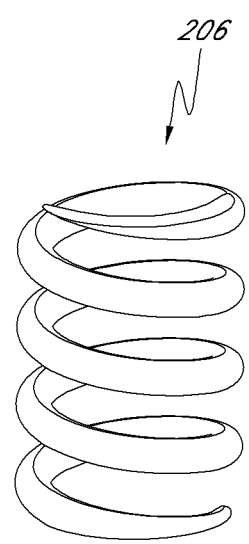
FIG. 18  FIG. 19

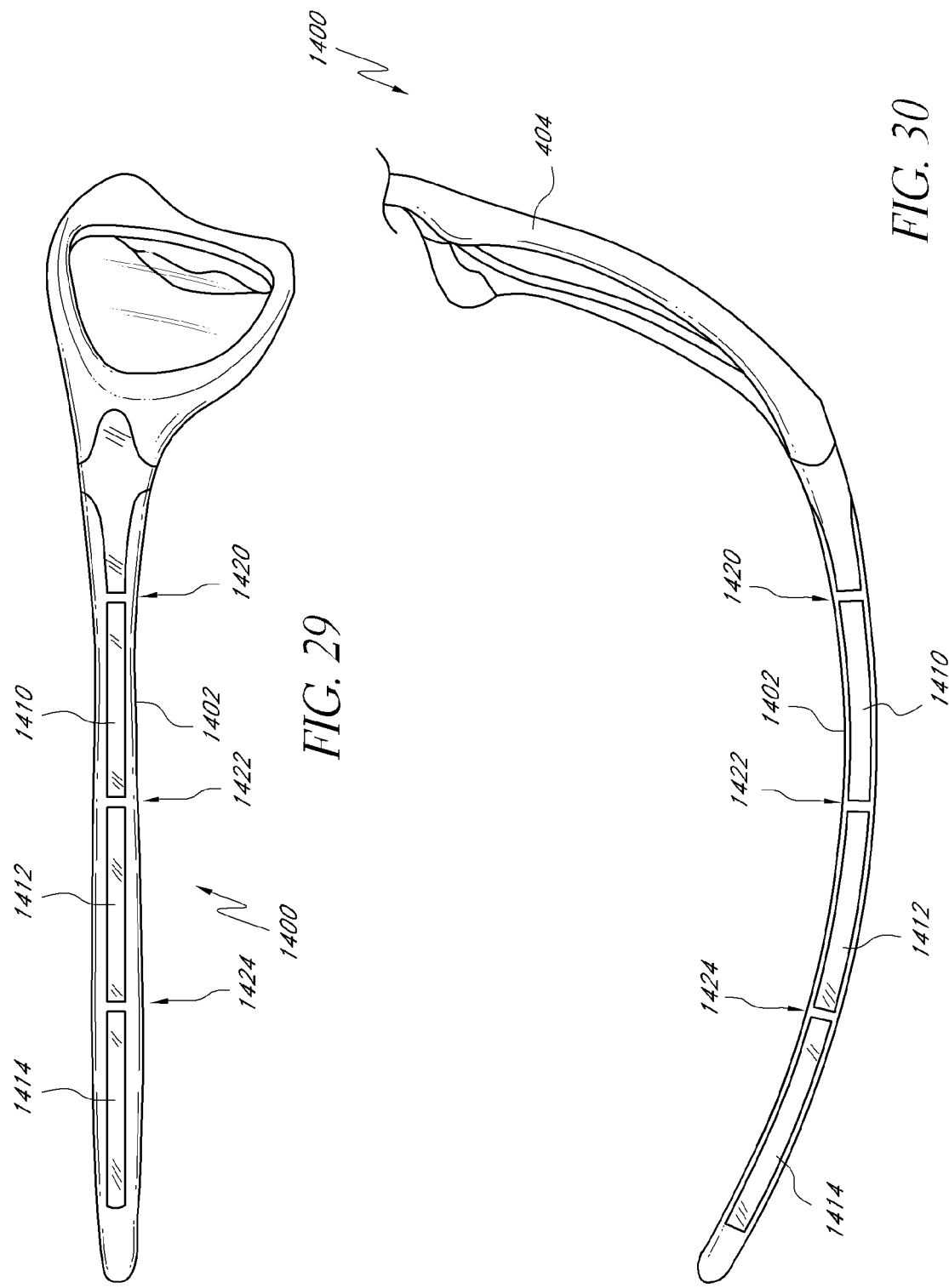

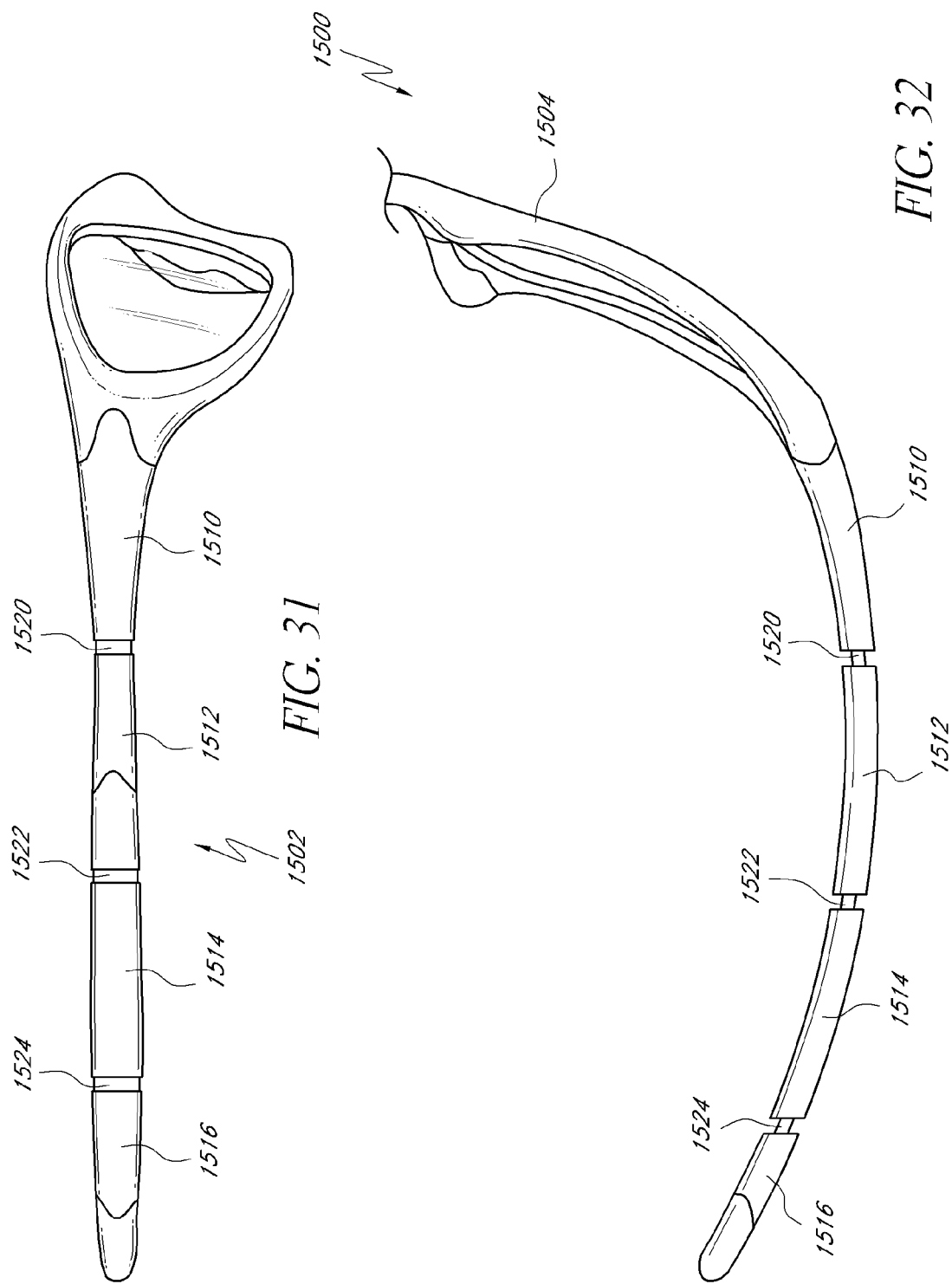

EYEGLASS EARSTEM WITH ENHANCED PERFORMANCE

BACKGROUND

1. Field of the Inventions

The present inventions relate generally to earstems for eyewear. More specifically, the present inventions relate to methods and apparatuses for providing a tunable multiflex earstem that utilizes one or more flex zones or points to enable an eyeglass to comfortably fit a variety of head sizes and shapes.

2. Description of the Related Art

A wide variety of improvements have been made in recent years in the eyewear field, particularly with respect to eyewear intended for use in active sports or as fashion sunglasses. These eyewear designs accomplish a variety of functional advantages, such as maximizing interception of peripheral light, reducing optical distortion and increasing the wearer's comfort level, compared to previous active sport eyewear.

Lens geometry has also been the subject of a variety of innovations. The unitary lens of the Blades® eyewear incorporates the cylindrical geometry disclosed, for example, in U.S. Pat. No. 4,859,048, issued to Jannard. This geometry allows the lens to closely conform to the wearer's face and intercept light, wind, dust, etc. from directly in front of the wearer (anterior direction) and peripherally (lateral direction). See also U.S. Pat. No. 4,867,550 to Jannard (toroidal lens geometry).

In another important areas, eyeglass fit and comfort has generally been addressed by varying eyeglass frame size, minimizing eyeglass weight, modifying the manner in which earstems engage ears of the wearer, and utilizing nosepiece and ear-contacting materials that are comfortable for extended use, to name a few.

Eyeglass fit and comfort has been determined at least in part due to the material of which the eyeglass is made. For example, plastic or injection molded frame eyeglasses are often more flexible than metal frame eyeglasses, and therefore could provide lighter overall weight and greater flexibility than a metal frame eyeglass. Although metal frame eyeglasses have been improved in some ways, such as incorporating a spring overextension feature into the hinge connection of the earstem with the frame, the spring overextension feature is primarily useful in facilitating placement and mounting of the eyeglass on the head of the wearer. Such features may have moderately improved the flexibility and fit of plastic and metal frame eyeglasses; however, rigid frames and earstems do not provide any dynamic adjustment or flexibility. As such, prior art eyeglass designs do not adjust well over a range of head sizes and shapes.

SUMMARY

As noted above, one of the important areas for improvement in eyeglass designs is the area of improving the fit and comfort of the eyeglass. Various eyewear designs have been provided which reduce the weight of the eyeglass, allow the wearer to customize the fit of the eyeglass, or otherwise seek to alleviate pressure and discomfort during use. However, despite the many advances that have been made, there remains a need for a self-customizing eyewear design that can be worn on a variety of head sizes and shapes and eliminate lateral pressure on the temples. Further, there remains a need for a tunable earstem design that adjusts geometrically along its length to a corresponding head size and shape. In addition, there remains a need for an earstem design that enhances retention and performance of the eyeglass.

In particular, according to at least one of the embodiments disclosed herein is the realization that metal frame eyeglasses only provide limited adjustability for a wearer and usually do not achieve an optimal fit over a range of different head sizes and shapes. Although it is noted above that some prior art metal frame eyeglasses provide a spring overextension feature at the earstem hinge, the spring overextension feature is generally the only flexible part of the eyeglass because the earstems of metal frame eyeglasses are usually rigid. As such, a given metal frame eyeglass size may comfortably fit onto a narrow head and make it easier for a user to put the eyeglasses on. However, such an eyeglass generally has only a limited range of adjustability and flexibility and therefore only fits a very narrow range of head sizes and shapes.

Therefore, in accordance with at least one of the embodiments disclosed herein is the realization that metal frame eyeglasses can be improved by modifying the earstems such that the earstems exhibit flexural properties similar to those exhibited by a plastic or injection molded earstem. Further, some embodiments provide for a metal earstem that comprises one or more flex zones or points that allow the earstem to adjust to the natural and variable shape of a variety of head sizes and shapes.

Regardless of the material, some embodiments of the earstem can comprise one or more flex zones or points. The flex zones or points can be strategically configured to allow the earstem to provide a natural, versatile fit over a range of head shapes and sizes. For example, a first flex zone can extend along an initial anterior portion of the earstem, a second flex zone can extend along a middle portion of the earstem, and a third flex zone can extend along the anterior portion of the earstem. In particular, some embodiments are configured such that the first and second flex zones extend generally along an anterior half of the earstem while the third flex zone extends along a posterior half of the earstem. Further, some embodiments can be configured such that the number of flex zones or points is distributed evenly along the earstem. For example, three flex zones or points could be distributed along the anterior portion, the middle portion, and along the posterior portion of the earstem. The number of flex zones and locations of the same can be varied as desired. The present disclosure enables the modification and adaptation of these principles to a variety of earstem shapes, sizes, and applications.

It is noted that although some embodiments are discussed as being made from metal, any of the embodiment disclosed herein can be made of metal, plastic, and/or composite materials. Thus, although many of the embodiments provide an effective solution to providing a metal earstem with enhanced performance, embodiments can also be made of plastic, composite, or combinations of materials.

Further, some embodiments can provide an earstem that uses a flexible spine or backbone and a motion-limiting apparatus. In some embodiments, the motion limiting apparatus can comprise one or more segments or components that are attached to or formed integrally or monolithically with the spine.

In some embodiments, the motion limiting apparatus can operate to limit motion of the spine through interference or contact between portions of the segment against the spine during deflection of the spine. For example, a segment can comprise a pocket or an area of relief into which the spine can deflect until contacting a bottom surface of the pocket or area of relief, thereby limiting motion of the spine. Further, in some embodiments, the motion limiting apparatus can operate to limit motion of the spine through interference or contact between adjacent segments. For example, the spine can deflect until adjacent segments are brought into contact with each other in such a manner than further deflection of the spine is prevented. These embodiments, and various other embodiments, are described and illustrated further herein.

Accordingly, the present inventions relate to a variety of earstem configurations that provide enhanced performance. The earstem can comprise at least one flexible portion and at least one relatively rigid portion that can each be modified to control one or more characteristics of the deflection of the earstem. Some of the characteristics of the deflection of the earstem can include the range of deflection, the number of deflection zones or points, the stiffness of the earstem, the deflection mode, and the structural constraints, to name a few. As a result, some of the embodiments disclosed herein can be implemented to provide an eyeglass that provides a customized to fit regardless of the wearer's head size or shape.

Some embodiments disclosed herein provide an eyeglass comprising a frame and an earstem attached to the frame. In some embodiments, the earstem can be fixedly attached to the frame. For example, the earstem may be formed monolithically with the frame or include a flexible point that allows limited movement of the earstem relative to the frame while preventing the earstem from being fully pivoted inwardly towards the frame to a stowed position.

In other embodiments, the earstem can be hingedly attached to the frame at a hinge joint that allows the earstem to be pivoted inwardly towards the frame to the stowed position. Hinge joint articulation may be limited by the flexibility and/or structure of the earstem. The hinge joint can be pretensioned or biased towards a given position. In embodiments wherein the earstem can be moved to a stowed position, the earstem can likewise be configured such that this joint allows flexibility from a deployed position in order to adjust for large or small head sizes and shapes.

Optionally, the earstem can include a plurality of discrete, flexible zones or points. Each of the zones or points can provide a degree of deflection for the earstem. Further, the arrangement and placement of the zones or points along the earstem can be configured to optimize the manner in which an earstem adjusts to a given head size and shape. In this regard, one or more flexible zones or points can be provided at one or more locations along the length of the earstem in a manner such that the earstem can be interchangeably worn and adjusted to a variety of head sizes and shapes while providing superior comfort and retention.

Further, in some embodiments, the earstem can optionally comprise a plurality of discrete segments or zones whereat the earstem is inflexible that are separated by a flexible zone or point. The length, geometry, and size of the segments can vary and may be configured to influence and/or control the motion, flexibility, and/or function of the earstem. For example, in some embodiments, the earstem can provide differential flexibility. In addition, in some embodiments, the earstem can provide a maximum range of movement or bending that is limited or controlled by interference between components of the earstem, such as the segments or spine or backbone of the earstem. For example, in some embodiments, the earstem can provide a range of motion that is limited by interference between a spine or backbone and a component of the earstem, such as a segment. The segment can comprise a pocket or area of relief into which the spine or backbone can deflect until contacting a bottom surface of the pocket or area of relief, which can then serve to prevent further deflection of the spine or backbone. In addition or in the alternative, the earstem can provide a range of motion that is limited by interference between segments of the earstem that contact each other such that further deflection is prevented due to interference or lack of clearance between segments of the earstem. Thus, in some embodiments, the displacement of components of the earstem can be limited at least partially due to interference between one or more components of the earstem.

Some embodiments provide for an earstem that comprises a metal spine and a plurality of segments that are attached to the spine. The metal can be titanium in some implementations. The segments can be fastened to the spine using fastening means such as mechanical fasteners including screws, bolts, etc. or other fastening means such as welding, adhesives, etc. The segments can be separated from each other along the spine. In some embodiments, one or more flex zones or points can be created along the spine. For example, a flex zone or point can be disposed between the spot at which the spine attaches to a frame of an eyeglass and the spot at which the spine attaches to a first segment disposed adjacent to the frame. Another flex zone or point can be disposed between another spot at which the spine attached to the first segment and a spot at which the spine attaches to a second segment. Further, yet another flex zone can be disposed along a tail, free end, or posterior end of the spine. In such embodiments, one or more of the segments can comprise a pocket or area of relief into which the spine can deflect until contacting a bottom surface of the pocket or area of relief, which can then serve to prevent further deflection of the spine. In addition or in the alternative, the earstem can provide a range of motion that is limited by interference between the frame and the first segment that contact each other, and/or the first and second segments of the earstem that contact each other, such that further deflection is prevented due to interference or lack of clearance between the first segment and the frame and/or between the first and second segments of the earstem.

Moreover, in some embodiments, the earstem can be configured to provide an undeflected position and one or more deflected positions. In such embodiments, the earstem can comprise one or more flexible zones or points and be configured such that one or more flexible zones or points are activated upon movement from the undeflected position to a deflected position or upon movement from a given deflected position to another give a deflected position.

Furthermore, in some embodiments, the earstem can be configured to comprise a uniquely configured hinge joint assembly that can be formed when the earstem is hingedly coupled to a frame of an eyeglass. For example, an anterior portion of the earstem can comprise a cam configured to bias the earstem in one of an open or deployed position and a closed or stowed position. In some embodiments, the cam can comprise a washer and a protrusion on the anterior portion of the spine that engages protrusions or recesses of the washer to be urged toward one or more rotational positions.

In some embodiments, the anterior portion of the spine can be split into upper and lower members. In such embodiments, the cam of the hinge joint assembly can be disposed at the lower member of the anterior portion of the spine. Further, by action of the cam, the upper and lower members of the anterior portion of the spine can be urged together when the earstem is moved away from the open position or away from the closed position. In this regard, the spine can be configured such that the urging together or deflection of the upper and lower members is a movement that is generally elastically resisted. Thus, when possible, the separation force of the upper and lower members will cause the earstem to be biased toward either the open position or the closed position. In addition, some embodiments can include a spring that acts as an assist to the separation force of the upper and lower members to urge them apart. In this manner, an initial force can be required to move the earstem from either the open or closed position, but as the earstem is pivoted, the cam action of the joint will cause that the earstem is naturally drawn into the other one of the open or closed position as it moves toward such position.

In accordance with an embodiment, an enhanced performance earstem is provided for eyeglasses. The earstem can comprise an elongate body and at least a first segment and a second segment on the body. The elongate body can have an anterior end and a posterior end. The first segment and the second segment can be separated by a flex zone or point. Further, a center of the flex zone or point can be within the range of from about 20 mm to about 70 mm from the anterior end of the elongate body. In some implementations, the center of the flex zone can be within the range of from about 25 mm to about 45 mm from the anterior end of the elongate body In some implementations, the elongate body can deflect relative to at least a portion of one of the first and second segments. For example, one of the first and second segments can comprise a recess configured to receive at least a portion of the elongate body for allowing deflection of the elongate body relative to the respective one of the first and second segments. Further, the recess can comprise a contact surface configured to at least partially abut the elongate body for constraining deflection of the elongate body. A recess can be formed along one of the posterior and anterior portions of a given segment. It is also contemplated that a given segment can comprise a pair of recesses separated by an attachment zone whereat the elongate body attaches to the given segment.

Some implementations can also be provided wherein the first segment and the second segment are separated at the flex zone or point by at least a first gap. In this regard, deflection of the earstem at the flex zone or point can change a width of the first gap. For example, deflection of the earstem can be operative to reduce the first gap such that the first segment and the second segment contact each other to prevent further deflection of the earstem. The earstem can be configured to deflect at the flex zone or point until the first segment contacts the second segment. In some implementations, the earstem can be configured such that the first gap can separate the first segment and the second segment such that the first segment and the second segment do not touch when the earstem is in an undeflected position.

Optionally, the earstem can also be configured such that the flex zone or point can permit relative angular deflection of the first segment relative to the second segment within the range of from about 5° to about 40°. Further, the range can be within about 10° to about 20°. In some embodiments, the earstem can further comprise another flex zone or point, and the other flex zone or point can be disposed within the range of between about 30 mm to about 70 mm from the anterior end. Further, the other flex zone or point can be disposed within the range of between about 40 mm to about 60 mm from the anterior end, and in some cases, about 50 mm from the anterior end.

In some embodiments, the earstem can comprise three flex zones or points extending along the earstem. The flex zones may be separated from by one a relative rigid zone or point. It is also contemplated that the earstem can comprise four or more flex zones or points.

In some implementations, the first segment and the second segment can be disposed externally along the elongate body. The earstem can also be configured such that the first segment and the second segment can be formed separately from and coupled to the elongate body of the earstem. Moreover, the earstem can also be configured such that the first segment and the second segment can be generally rigid relative to the elongate body.

In another embodiment, an earstem is provided that can have differential flexibility. The earstem can comprise a flexible, elongate body having an anterior end and a posterior end. The body can have a plurality of relatively flexible zones. Each flexible zone can be separated from an adjacent flexible zone by a relatively rigid zone. Further, the relatively flexible zones can have different stiffnesses.

Some implementations of the earstem can be provided in which the stiffness of a first relatively flexible zone is greater than the stiffness of a second relatively flexible zone to provide progressive deflection of the earstem upon exertion of bending stress on the earstem. Further, the first relatively flexible zone can be disposed anteriorly relative to the second relatively flexible zone.

In some aspects, the earstem can be configured such that the first relatively flexible zone can finish deflecting before the second relatively flexible zone finishes deflecting. In this regard, the first relatively flexible zone can deflect prior to deflection of the second relatively flexible zone or both zones can deflect simultaneously.

Further, the elongate body, the rigid zones, and the flexible zones can be monolithically formed. Additionally, the earstem can be configured to further comprise an insert within the elongate body. The insert can comprise at least first and second relatively rigid segments separated by a relatively flexible zone. The earstem can optionally be configured such that the elongate body is comolded with the insert. Furthermore, the earstem can be configured such that at least one dimension of the elongate body remains generally constant between the anterior end and the posterior end of the earstem.

In accordance with some implementations, the earstem can be configured such that the relatively rigid zones each comprise at least one elongate segment. The relatively flexible zones can comprise at least one interconnector extending intermediate the elongate segments to interconnect the elongate segments in a general end-to-end manner to form at least first and second flex zones or points. Additionally, the elongate segments of the relatively rigid zones can be formed monolithically with each other and with the interconnectors of the relatively flexible zones.

In accordance with another embodiment, an earstem is provided that can be configured to provide an adjustable and personalized fit for an eyeglass. The earstem can comprise an elongate body and at least a first segment. The elongate body can define an anterior end that can be attached to the eyeglass and a posterior end that can extend rearwardly from the eyeglass. The at least first segment can be disposed along the earstem. The first segment can comprise a contact surface, and the contact surface can be positioned adjacent to the elongate body such that deflection of the elongate body causes relative movement between the contact surface and the elongate body. The contact surface can be configured to constrain deflection of the elongate body upon contact between the contact surface and the elongate body. The contact surface can permit relative movement between the first segment and the elongate body within a given range.

In some embodiments, the first segment can comprise another contact surface. Further, the contact surfaces can be separated by an attachment point whereat the first segment is coupled with the elongate body. Optionally, the earstem can comprise a second segment having a contact surface. Similar to the first segment, the second segment can be coupled to the elongate body such that the contact surface of the second segment serves to limit or restrain relative movement between the second segment and the elongate body. In some embodiments, the second surface limits or restrains movement between the second segment and the elongate body by contacting the elongate body. In other embodiments, it is contemplated that the second surface can limit or restrain movement between the second segment and the elongate body by contacting the first segment.

In yet another embodiment, an eyeglass is configured with earstems that can provide enhanced retention of the eyeglass on the head of a wearer. The eyeglass can comprise a frame and a pair of earstems. The frame can support at least one lens in the wearer's field of view. The pair of earstems can be attached to the frame for supporting the frame on the head of the wearer. Each earstem can comprise at least first and second flex zones or points whereat the earstems can bend. The first flex zone or point can provide a first degree of deflection, and the second flex zone or point can provide a second degree of deflection. In some implementations, the first degree of deflection can be different from the second degree of deflection such that the earstems provide progressive bending along a longitudinal axis of the earstems for providing a secure and conforming fit over a range of head sizes and shapes.

In accordance with some embodiments, the earstem can be configured such that the first degree of deflection can define a stiffness of the first flex zone or point and the second degree of deflection defines a stiffness of the second flex zone or point. Further, the first degree of deflection can define a maximum deflection of the earstem about the first flex zone or point and the second degree of deflection can define a maximum deflection of the earstem about the second flex zone or point. In this regard, it is contemplated that the earstems can comprise a plurality of segments being interconnected at the first and second flex zones or points. The maximum deflection of the earstem at a given flex zone or point can be limited by physical contact of adjacent segments at the given flex zone or point during deflection of the earstem at the given flex zone or point.

Some implementations of the earstem can be configured such that the earstem comprises a plurality of rigid segments with at least one segment extending generally between a first flex zone or point and a second flex zone or point of the earstem. Optionally, the rigid segments can be removably attachable to the earstem. Further, the rigid segments can comprise contact surfaces that are disposed adjacent to each other at the first and second flex zones or points, and the earstem can be configured such that deflection of the earstem is limited upon abutment of the contact surfaces of the adjacent segments.

BRIEF DESCRIPTION OF THE DRAWINGS

The abovementioned and other features of the inventions disclosed herein are described below with reference to the drawings of the preferred embodiments. The illustrated embodiments are intended to illustrate, but not to limit the inventions. The drawings contain the following figures:

FIG. 4 is a perspective view of an earstem segment or component, according to an embodiment.

FIG. 5 is an end view of the earstem segment or component shown in FIG. 4.

FIG. 6 is a cross-sectional top view of the earstem segment or component shown in FIG. 4, taken along lines 6-6 in FIG. 4.

FIG. 7 is a perspective view of another earstem segment or component, according to an embodiment.

FIG. 8 is an end view of the earstem segment or component shown in FIG. 7.

FIG. 9 is a cross-sectional top view of the earstem segment or component shown in FIG. 7, taken along lines 9-9 in FIG. 7.

FIGS. 16-17 are perspective views of a cam member, according to an embodiment.

FIG. 18 is a perspective view of a washer, according to an embodiment.

FIG. 19 is a perspective view of a spring, according to an embodiment.

FIG. 29 is a left side view of an earstem of an eyeglass, according to another embodiment.

FIG. 30 is a top view of the earstem shown in FIG. 29.

FIG. 31 is a left side view of another earstem of an eyeglass, according to yet another embodiment.

FIG. 32 is a top view of the earstem shown in FIG. 31.

DETAILED DESCRIPTION

Figure 1:
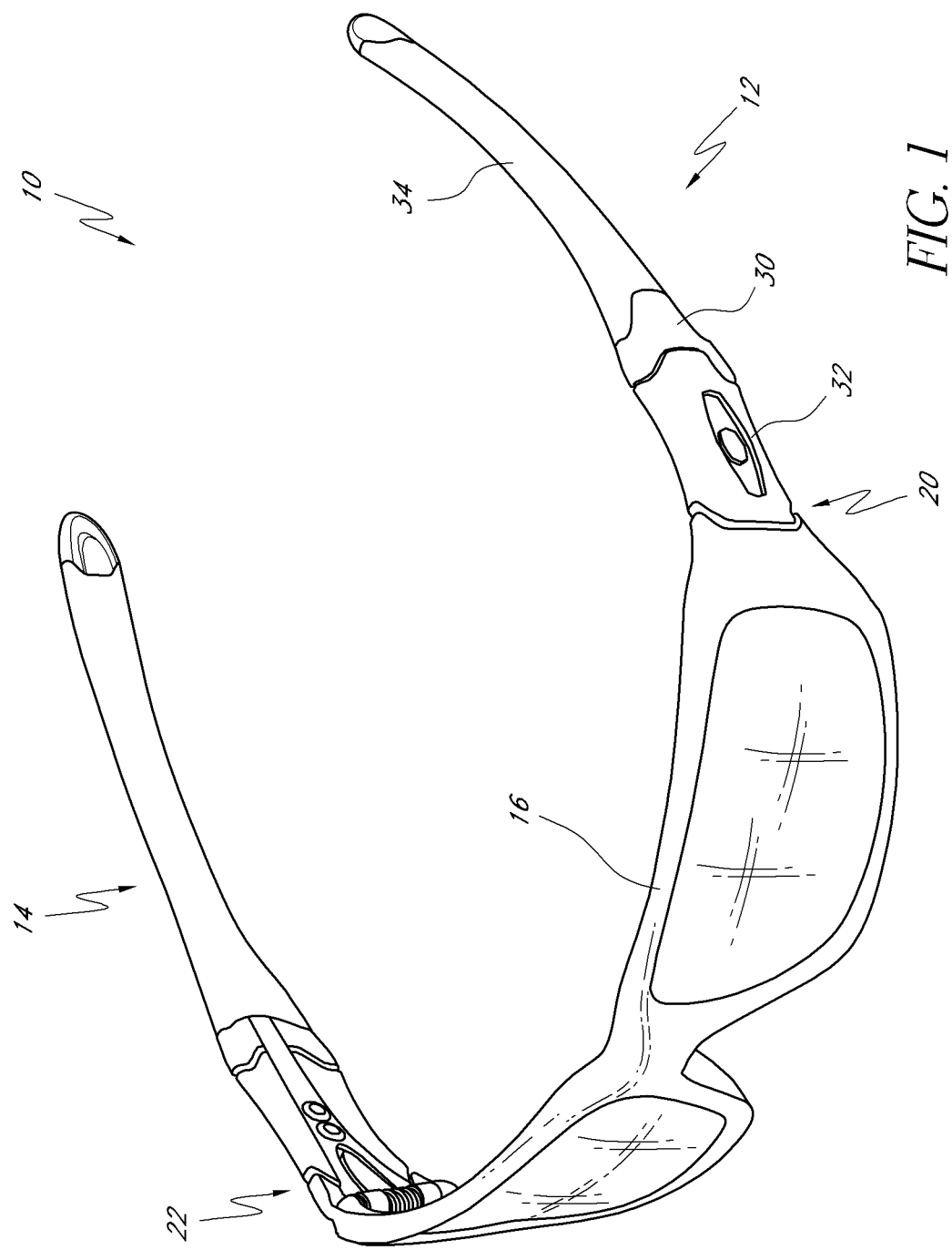
FIG. 1 is a perspective view of an eyeglass in accordance with an embodiment of the present inventions.

While the present description sets forth specific details of various embodiments, it will be appreciated that the description is illustrative only and should not be construed in any way as limiting. Additionally, it is contemplated that although particular embodiments of the present inventions may be disclosed or shown in the context of dual lens eyewear systems, embodiments can be used in both unitary and dual lens eyewear systems. Further, it is contemplated that although particular embodiments of the present inventions may be disclosed or shown in the context of frames having full orbitals, such embodiments can be used with frames having full or partial orbitals or rimless frames. Furthermore, various applications of such embodiments and modifications thereto, which may occur to those who are skilled in the art, are also encompassed by the general concepts described herein.

As discussed above, embodiments disclosed herein are operative to provide adjustability and optimal fit over a wide range of different head sizes and shapes. Accordingly, an eyeglass can be fabricated using metals or other stiff materials that may have desirable properties while nevertheless enabling the eyeglass to provide desirable flexural properties in the earstems thereof. For example, titanium, carbon fiber, aluminum, and other such materials provide superior mechanical properties while reducing the weight of the eyeglass. Indeed, metals or other rigid materials can be used to form the eyeglass, thus providing exceptional rigidity, durability, and wear resistance. However, prior to the development of the embodiments disclosed herein, and eyeglass made of such rigid materials would function very poorly in accommodating a wide range of head sizes and shapes. Thus, various embodiments disclosed herein enable the use of rigid materials such as metals, composites, and the like in eyewear while providing earstem flexibility that was previously unavailable in the eyeglass is made of such materials.

Thus, various embodiments are provided in which the eyeglass has a metal frame and is operative to provide superior adjustability and flexibility over a wide range of head sizes and shapes, as could be possible with a plastic eyeglass. Nevertheless, various features and aspects disclosed herein can be used in eyeglasses fabricated from any material, whether the eyeglass is made from plastic, composite, metal, or any combination thereof.

Therefore, in accordance with at least one of the embodiments disclosed herein is the realization that metal frame eyeglasses can be improved by modifying the earstems such that the earstems exhibit flexural properties similar to those exhibited by a plastic or injection molded earstem. Further, some embodiments provide for a metal earstem that comprises one or more flex zones or points that allow the earstem to adjust to the natural and variable shape of a variety of head sizes and shapes.

Regardless of the material, some embodiments of the earstem can comprise one or more flex zones or points. The flex zones or points can be strategically configured to allow the earstem to provide a natural, versatile fit over a range of head shapes and sizes. For example, a first flex zone can extend along an initial anterior portion of the earstem, a second flex zone can extend along a middle portion of the earstem, and a third flex zone can extend along the anterior portion of the earstem. In particular, some embodiments are configured such that the first and second flex zones extend generally along an anterior half of the earstem while the third flex zone extends along a posterior half of the earstem. Further, some embodiments can be configured such that the number of flex zones or points is distributed evenly along the earstem. For example, three flex zones or points could be distributed along the anterior portion, the middle portion, and along the posterior portion of the earstem. The number of flex zones and locations of the same can be varied as desired. The present disclosure enables the modification and adaptation of these principles to a variety of earstem shapes, sizes, and applications.

As noted above, although some embodiments are discussed as being made from metal, any of the embodiments disclosed herein can be made of metal, plastic, and/or composite materials. Thus, although many of the embodiments provide an effective solution to providing a metal earstem with enhanced performance, embodiments can also be made of plastic, composite, or combinations of materials.

Further, in addition to addressing many problems associated with eyeglasses made of rigid materials, the teachings and disclosure herein also enable a personal skill in the art to design an eyeglass having desirable aesthetic properties and later construct an exceptional functional platform that provides superior comfort and adaptability for wearers. In other words, embodiments disclosed herein enable the function of the eyeglass to follow the form of the eyeglass, rather than having the form or design of the eyeglass be dictated by the function thereof. This and other novel features of the embodiments disclosed herein provide an exceptional advance in the eyewear industry.

In the present description, various mechanical terms are used in reference to deformation and/or other structural characteristics of components of the embodiments disclosed herein. As used herein, term "stiffness" or "bending stiffness" can be defined as the resistance of an elastic body to deformation by an applied force. In this regard, stiffness is not the same as the "flexural or elastic modulus"; stiffness relates to a property of a solid body and flexural or elastic modulus relates to a property of a material of the solid body.

In other words, stiffness is a property of the solid body that is dependent on the material and the shape and boundary conditions. See Wikipedia, "stiffness." For example, with reference to embodiments disclosed herein, the bending stiffness "EI" of an earstem relates the applied bending moment to the resulting deflection of the earstem. The bending stiffness is the product of the elastic modulus "E" of the earstem material and the area moment of inertia "I" of the earstem cross-section. Further, when a plurality of components or components comprising a plurality of materials is used in the earstem, the equation is modified accordingly to account for the individual components and material variations. In a basic scenario, according to elementary beam theory, the relationship between the applied bending moment M and the resulting curvature κ of the beam is:

$$M = EI_\kappa = EI \frac{d^2 w}{dx^2}$$

where w is the deflection of the beam and x the spatial coordinate. Accordingly, as will be apparent to one of skill in the art, the bending stiffness of embodiments of the earstem can be measured using the principles discussed above.

Referring now to the figures, wherein embodiments are shown for purposes of illustrating features of the present inventions, and not for limiting the same, FIG. 1 illustrates an embodiment of an eyeglass 10 prepared in accordance with an aspect of the present inventions. The eyeglass 10 comprises a first earstem 12 and a second earstem 14. In the illustrated embodiment, the first and second earstems 12, 14 are attached to a frame 16 of the eyeglass 10 at respective first and second joints 20, 22. The first and second joints 20, 22 can enable the earstems 12, 14 to be selectively pivoted between a stowed position and a deployed position. As illustrated in FIG. 1, the earstems 12, 14 are positioned in the deployed position, ready for use.

Figure 2:
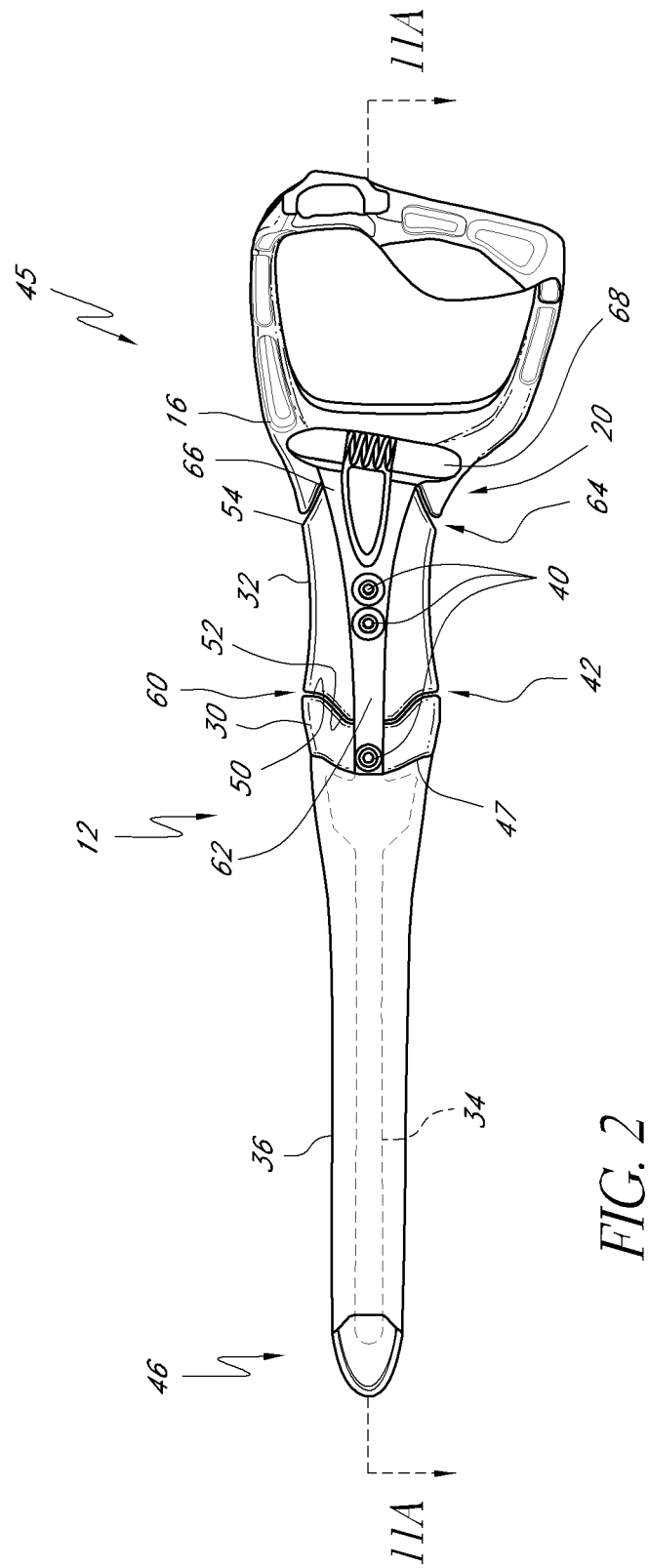
FIG. 2 is a right side view of an earstem of the eyeglass of FIG. 1.

The eyeglass 10 can further comprise one or more earstem bend control components. For example, referring to FIGS. 2-3, the first earstem 12, the first earstem 12 can comprise one or more segments 30, 32. In some embodiments, the segments 30, 32 can be formed monolithically with the first earstem 12. However, in other embodiments, the segments 30, 32 can be attached to a flexible, elongate body, spine, or backbone 34. As illustrated in FIG. 2, these segments 30, 32 can be attached to the body 34 using one or more mechanical fasteners 40. In this regard, the first earstem 12 can be flexible to the degree permitted by the segments 30, 32.

Figure 3:
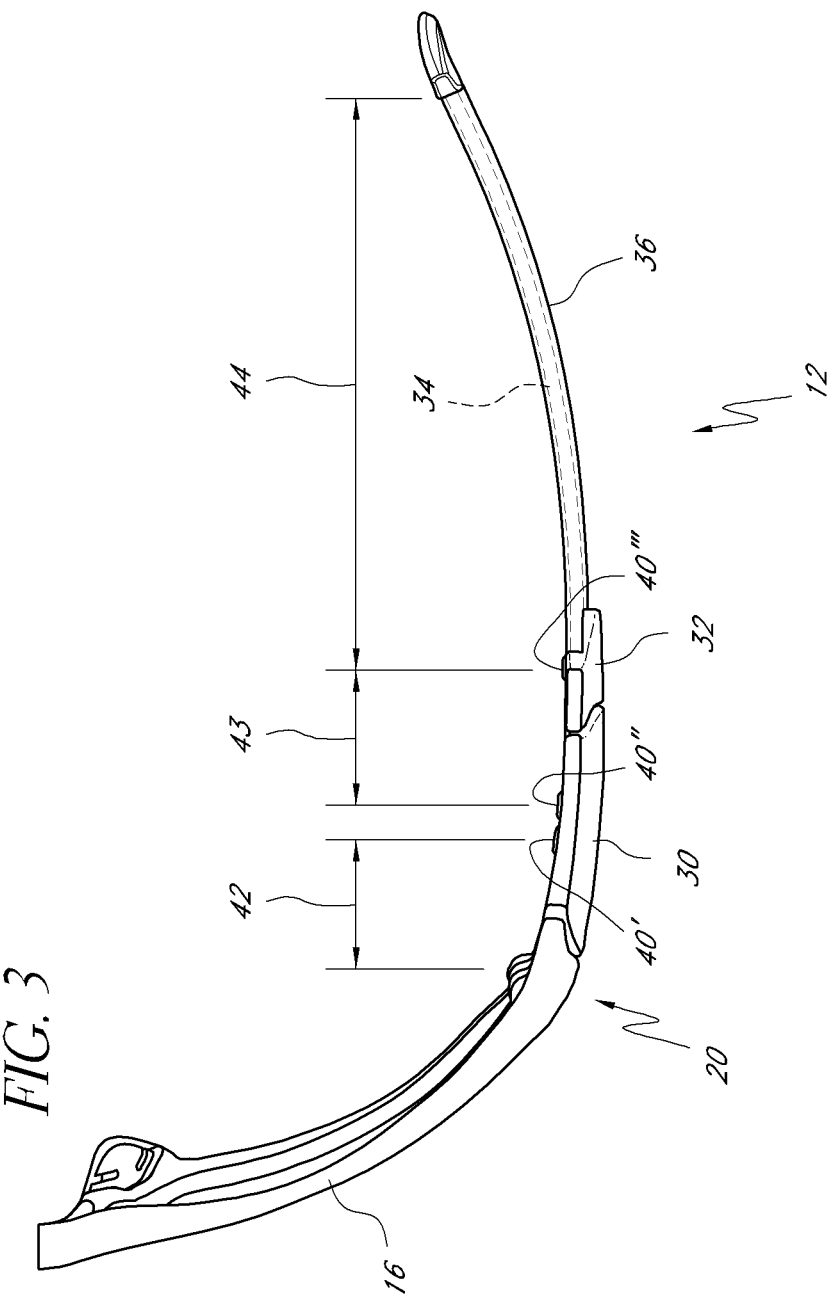
FIG. 3 is a top view of the earstem shown in FIG. 2.

Further, as shown in FIG. 3, the segments 30, 32 can also form one or more flexible zones or points, 42, 43, 44, whereat the first earstem 12 can bend. In the illustrated embodiment, a first flexible zone or point 42 is formed between the joint 20 and an anteriorly located first fastener 40'. A second flexible zone or point 43 is formed between a second fastener 40" and a third fastener 40'''. A third flexible zone or point 44 is formed between the third fastener 40''' and a posterior end 46 of the earstem 12.

In this regard, as used herein, the term "zone" or "point" can be used to refer generally to the location along an earstem at which the earstem bends or deflects. In some embodiments, the point of deflection can be at a joint formed between two structures, and the joint can comprise that deflection point where the structures are made of a common or separate material, or whether the structures are comolded, coupled together, or monolithically formed. A deflection zone of the earstem can be formed along that portion of the spine or backbone that is not constrained against bending. In some embodiments, deflection zones or points can be separated by zones or points where the spine or backbone is constrained against deflection.

In addition, in the various embodiments disclosed herein, it is contemplated that the flex zones or points should be configured such that deflection at a given flex zone or point does not permit the flex zone or point to undergo a stress that is greater than the yield stress of that material. For example, the earstem can be configured such that the allowable stress is less than about 70% of the yield stress of the material. Further, the earstem can be configured such that the allowable stress is less than about 50% of the yield stress of the material. Moreover, the earstem can be configured such that the allowable stress is between less than about 30-50% of the yield stress of the material.

For example, an elongate body or spine, whether formed separately or monolithically with other components, can be configured to undergo bending stresses in order to permit deflection of the ear stem. As noted above, the elongate body or spine should be configured such that the allowable bending stresses remain within an acceptable or under an acceptable percentage of the yield stress of the elongate body or spine. Further, stress concentrations at given flex zones or points should be minimized such that stresses are distributed to avoid failure. In this regard, it is contemplated that one of skill in the art can design the ear stem such that a stresses exerted on any given component stay within an acceptable range below the yield stress during use of the eyeglass.

In the illustrated embodiment of FIGS. 1-19, the flexible zones represent those areas along which the body 34 of the earstem 12 can bend or deflect. Other areas of the body 34 can be constrained against deflection, such as the portion of the body 34 located between the first and second fasteners 40', 40". These features and the advantages thereof are discussed in greater detail below.

In accordance with another aspect of the embodiment illustrated FIGS. 1-19, the segments 30, 32 can comprise one or more contact surfaces that are configured to assist in limiting and/or controlling deflection of the earstem 12. For example, as discussed below with reference to FIGS. 4-11B, the body or spine 34 of the earstem 12 can be a loud to deflect within a given range until contacting a surface of one of the segments 30, 32. Upon contact with the surface, the body or spine 34 will be constrained against further deflection, thus constraining the earstem 12 against deflection as well. In some embodiments, the contact surfaces of the segments 30, 32 can be formed on an interior side of the segments 30, 32.

For example, referring now to FIGS. 4-6, an embodiment of the second segment 32 is shown in a perspective, a side, and a cross-sectional top view. The second segment 32 can comprise a first contact surface 50, an attachment portion 100, and a recess, pocket, or area of relief 102. In this regard, the attachment portion 100 of the second segment 32 can be configured to attach with and/or receive at least a portion of the body 34 such that the second segment 32 can be mounted onto the body 34. For example, the second segment 32 can be mounted onto the body or spine 34 of the earstem 12 using a fastener, such as a bolt or screw which can be passed through the body or spine 34 and attached to the attachment portion 100 of the second segment 32.

FIG. 6 illustrates a the cross-sectional top view of the second segment 32 in which the recess 102 widens from a recess of the attachment portion 100 such that the body 34 can be laterally deflected relative to the second segment 32. Thus, upon attachment to the body 34, an upper surface 104 of the attachment portion 100 will abut and (along with the fastener used to attach the second segment 32 to the body 34) constrain the corresponding portion of the body 34 from movement while a length or portion of the body 34 adjacent to the recess 102 is unconstrained. Thus, due to the presence of the recess 102, a portion of the body 34 will be generally unconstrained against deflection along the anterior portion 106 of the second segment 32. In other words, the body 34 can be rigidly attached to the second segment 32 at the attachment portion 100 while being able to deflect into the recess 102 formed at the anterior portion 106 of the second segment 32. However, it is noted that a top surface 110 of the recess 102 can serve to constrain lateral deflection of the body 34. As such, the configuration and geometry of the recess 102 and the top surface 110 can be selectively configured to allow a desired degree of lateral deflection of the body 34.

With reference now to FIG. 7-9, an embodiment of the first segment 30 is shown in a perspective, a side, and a cross-sectional top view. The first segment 30 can comprise a second contact surface 52 and a third contact surface 54. The second contact surface 52 can be disposed along a posterior end 120 of the first segment 30, and the third contact surface 54 can be disposed along and anterior end 122 of the first segment 30. The first segment 30 can also comprise an attachment portion 130 and at least one recess, pocket, or area of relief. In some embodiments, the attachment portion 130 can be disposed along a central portion of the first segment 30. However, it is also contemplated that the attachment portion can be located along either the posterior or anterior portions 120, 122 of the first segment 30.

As discussed above with respect to the second segment 32, the attachment portion 130 of the first segment 30 can be configured to attach with or receive at least a portion of the body 34 such that the first segment 30 can be mounted onto the body 34. For example, the first segment 30 can be mounted onto the body or spine 34 of the earstem 12 using a fastener, such as a bolt or screw which can be passed through the body or spine 34 and attached to the attachment portion 130 of the first segment 30.

Figure 11A:
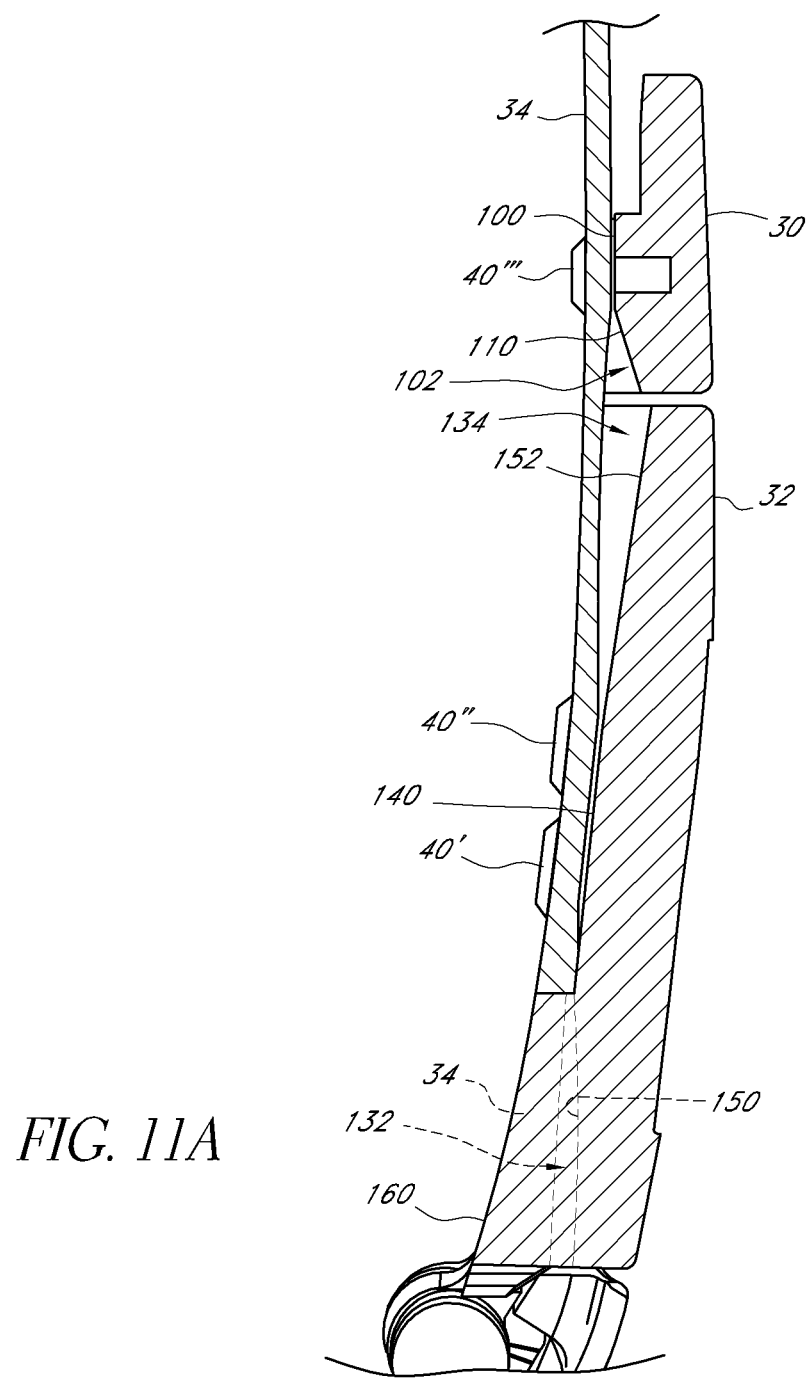
FIG. 11A is a top cross-sectional view of the earstem shown in FIG. 10A which is taken along lines 11A-11A of FIG. 2, wherein the earstem is in the undeflected position.
Figure 11B:
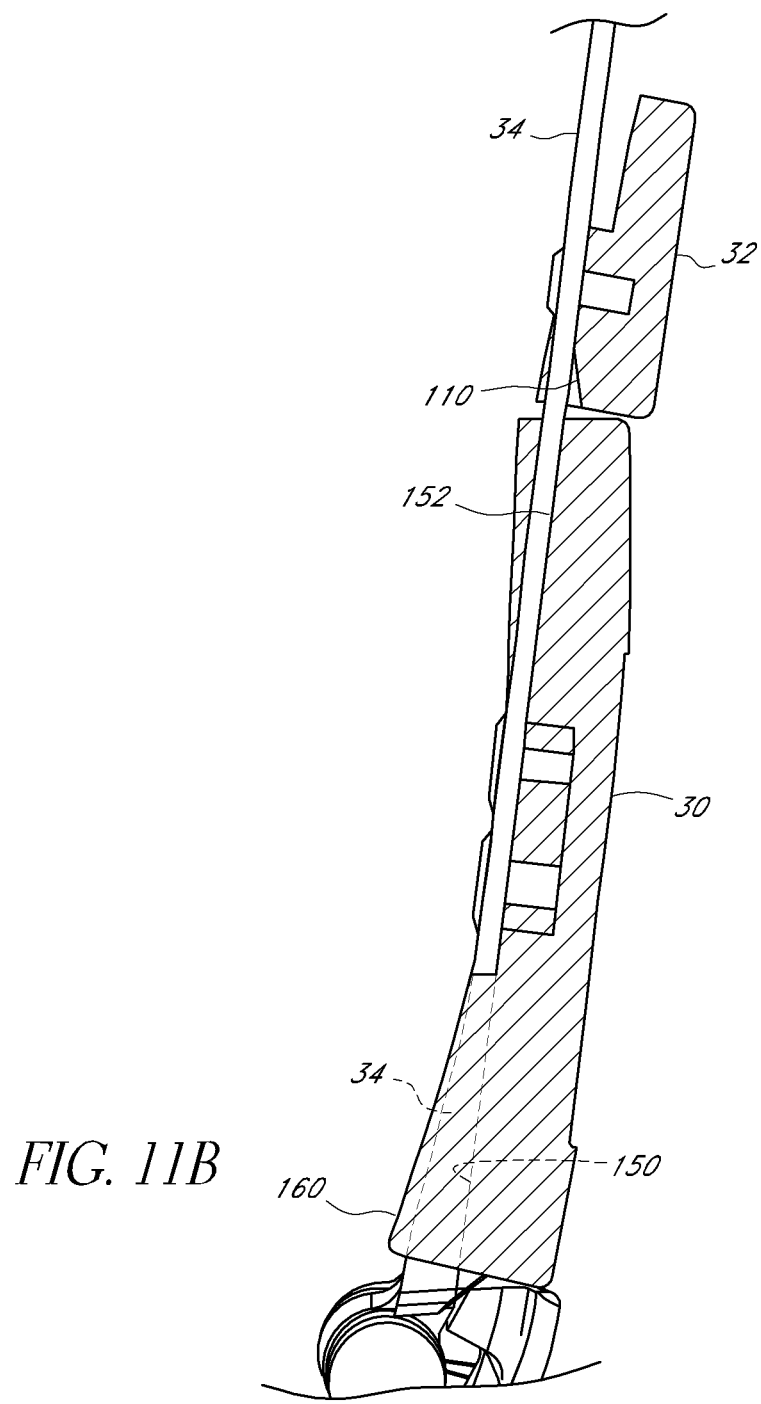
FIG. 11B is a top cross-sectional view of the earstem shown in FIG. 11A, wherein the earstem is in the deflected position.

Further, the first segment 30 can comprise an anterior protrusion 160. The anterior protrusion 160 can be disposed intermediate the upper and lower fork members (discussed further below) of the body or spine 34. FIGS. 11A-B also illustrate the movement of the segment 32 relative to the body or spine 34, which movement is easier to see noting the position of the protrusion 160 relative to the body or spine 34.

Further, as shown in the illustrated embodiment, the first segment 30 can comprise an anterior recess 132 and a posterior recess 134. Similar to the recess 102 of the second segment 32, the anterior and posterior recesses 132, 134 can be configured to allow the body 34 to deflect relative to the first segment 30. In this regard, once the first segment 30 is mounted onto the body 34, the body 34 can deflect into either of the anterior or posterior recesses 132, 134.

For example, with reference to FIG. 9, the recesses 132, 134 both widen from a recess of the attachment portion 130 such that the body 34 can be laterally deflected relative to the first segment 30. Thus, upon attachment to the body 34, an upper surface 140 of the attachment portion 130 will abut and (along with one or more fasteners used to attach the first segment 30 to the body 34) constrain the corresponding portion of the body 34 from movement while a length or portion of the body 34 adjacent to the recesses 132, 134 are unconstrained from movement.

Thus, due to the presence of the recesses 132, 134, portions of the body 34 will be generally unconstrained against deflection along the anterior and posterior portions 120, 122 of the first segment 30. In other words, the body 34 can be rigidly attached to the first segment 30 at the attachment portion 130 while being able to deflect into the recesses of 132, 134 formed at the respective ones of the anterior and posterior portions 120, 122 of the first segment 30. However, it is noted that a top surface 150 of the recess 132 and a top surface 152 of the recess 134 can serve to constrain lateral deflection of the body 34. As such, the configuration and geometry of the recesses 132, 134 and the top surfaces 150, 152 can be selectively configured to allow a desired degree of lateral deflection of the body 34.

Accordingly, the embodiment illustrated in FIGS. 1-19 can be configured to allow the body or spine 34 to deflect relative to the first and second segments 30, 32. Further, the movement and/or deflection of the body 34 can also be limited and/or controlled by the first and second segments 30, 32.

Figure 10B:
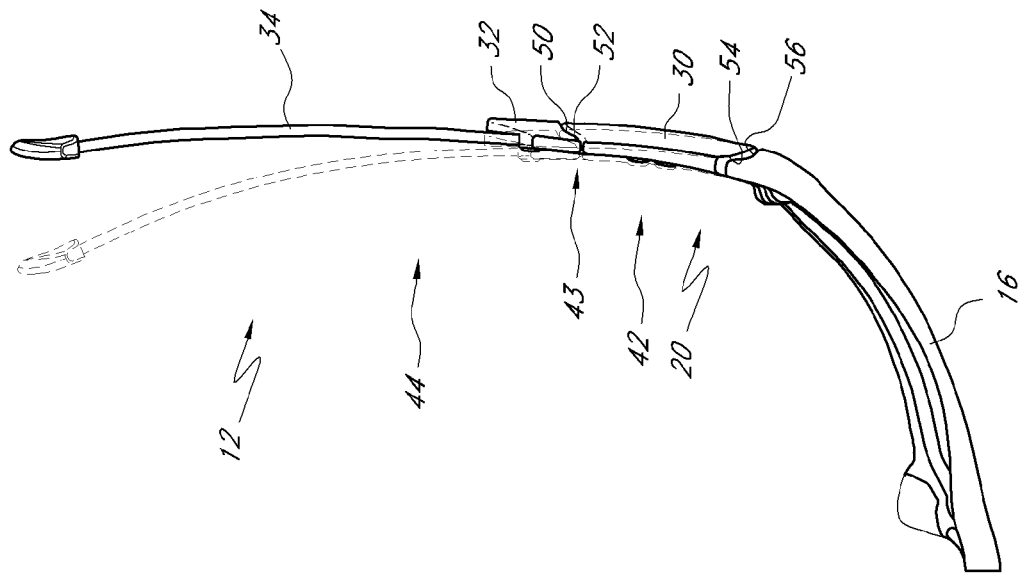
FIG. 10B is a top view of the earstem shown in FIG. 2, wherein the earstem is in a deflected position.
Figure 10A:
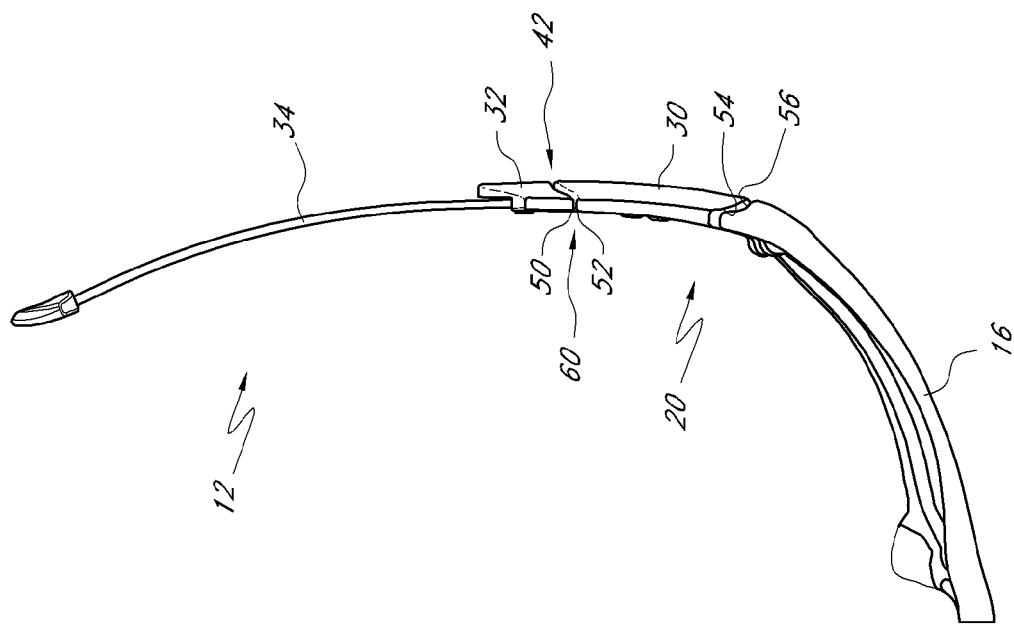
FIG. 10A is a top view of the earstem shown in FIG. 2, wherein the earstem is in an undeflected position.

FIGS. 10A-B illustrate the first earstem 12 in an undeflected position (shown in FIG. 10A) and a deflected position (shown in FIG. 10B). As shown, the first and second segments 30, 32 serve to limit the lateral deflection of the body 34 along the initial or anterior half of the earstem 12. As noted above, the first and second flex zones or points 42, 43 shown in FIG. 3 lie generally within the initial or anterior half of the earstem 12. In this regard, the third flex zone 44 comprises the posterior half of the earstem 12. Accordingly, the deflection of the posterior half of the earstem 12 will generally be dictated by the geometry and material properties of the body or spine 34 in this embodiment. Thus, FIGS. 10A-B illustrate how the earstem 12 can accommodate a variety of head sizes and shapes.

Optionally, in some embodiments, it is contemplated that the first and second contact surfaces 50, 52 of the respective ones above the first and second segments 30, 32 can be configured to limit and/or control deflection of the earstem 12. In this regard, it is contemplated that deflection of the earstem 12 can be restrained at the flexible zone or point 43 due to the interaction between the first and second contact surfaces 50, 52. In other words, the first earstem 12 can be restrained from further medial bending beyond a given range due to interference or contact between the first and second segments 30, 32.

For example, the deflection of the first earstem 12 can be controlled and/or limited by adjusting the geometry and/or spacing of the first and second contact surfaces 50, 52 of the segments 30, 32. The first and second segments 30, 32 can be spaced apart by a gap 60 in the undeflected position, and the earstem 12 can be configured such that the gap 60 closes as the first earstem 12 moves from the undeflected position to the deflected position. When the gap 60 is completely closed, the contact surfaces 50, 52 of the first and second segments 30, 32 can abut each other and prevent further deflection of the earstem 12 in the second flex zone 43. The gap 60 can therefore correspond at least in part to an initial or primary degree of permissible deflection that can be made between the segments 30, 32 of the first earstem 12. The size of the gap 60 can be varied in order to provide a desired initial or primary degree of deflection at the flexible zone or point 43.

In accordance with another unique aspect of some embodiments, the first and second contact surfaces 50, 52 can also be arcuately formed. As a result, some embodiments of the first and second contact surfaces 50, 52 can engage each other not only to limit further medial bending of the first earstem 12, but to also limit torsional or vertical bending of the first earstem 12 at the flexible zone or point 43.

In accordance with another aspect of the embodiment shown in FIGS. 1-19, it is contemplated that the flex zones can be located at a given distance from an anterior end 45 of the earstem 12, such as the joint 20. In other words, the flex zones can be distributed along the first earstem 12 intermediate the anterior end 45 and a posterior end 46. The first earstem 12 can be configured to optimize the length and/or location of the flex zones.

For example, as discussed above with respect to FIG. 3, the first flex zone 42 can extend between the joint 20 and the fastener 40'. The second flex zone 43 can extend between the fastener 40' and the fastener 40". The third flex zone 44 can extend between the fastener 40''' and the posterior end 46 of the earstem 12. It is contemplated that the length and location of the flex zones 42, 43, 44 can be modified by changing the location of the fasteners in the disclosed embodiment. Further, the space between the fasteners 40' and 40" can also be modified to adjust the length of an inflexible zone of the body or spine 34.

It will be appreciated that the length and/or location of the flexible zones of the earstem 12 can determine the deflected shape or contour of the first earstem 12. For example, the first flex zone 42 can be configured to extend along the anterior half of the earstem 12. Specifically, the first flex zone 42 can extend along the anterior one third section of the earstem 12. In some embodiments, the first flex zone 42 can be configured to extend from the joint 20 and have a length of between about 10 mm to about 30 mm. In the illustrated embodiment, the length of the first flex zone 42 is approximately 20 mm.

Further, the second flex zone 43 can be configured to extend along the anterior two-thirds portion of the earstem 12. In particular, the first flex zone 42 and the second flex zone 43 can collectively extend along the anterior half section of the earstem 12. In some embodiments, the second flex zone 43 can begin at a distance of between about 10 mm to about 40 mm from the joint 20 and can have a length of between about 10 mm to about 30 mm. Thus, a center of the second flex zone 43 can be about 20 mm to about 70 mm from the joint 20. In the illustrated embodiment, the second flex zone 43 begins at about 25 mm from the joint 20 and has a length of about 20 mm.

Finally, the third flex zone 44 can be configured to extend along the posterior two thirds portion of the earstem 12. In particular, the third flex zone 44 can extend at least along the posterior half section of the earstem 12. In some embodiments, the third flex zone 44 can begin at a distance of between about 30 mm to about 70 mm from the joint 20 and can have a length of between about 40 mm to about 120 mm. In the illustrated embodiment, the third flex zone 43 begins at about 45 mm from the joint 20 and has at length of about 90 mm.

Similarly, as shown in FIG. 2, a posterior end 47 of the second segment 32 can be spaced at a length or distance from the joint 20. Further, the interconnection of the second segment 32 with the body 34 and the shape of the second segment 32 can be selected to constrain movement of the body 34 adjacent to the second segment 32. It is contemplated that the elongate body 34 of the first earstem 12 may tend to deflect at the posterior end 47 of the second segment 32. This deflection is similar to that which may occur at the flexible zone or point 42 and the joint 20 in that the configuration of the end 47 and the presence or absence of a recess can determine whether and how much the body 34 is permitted to deflect. As such, the length or distance of the end 47 from the joint 20 can be modified similarly to the length or distance of the fastener 40' from the joint 20, as regards the first segment 30. In this regard, the end 47 can be spaced at approximately the middle one-third section of the earstem 12. More specifically, the end 47 can be spaced at approximately the midpoint of the earstem 12. In some embodiments, the length or distance of the end 47 from the joint 20 can optionally be configured to be between about 30 mm to about 70 mm. In the illustrated embodiment, the length or distance of the end 47 from the joint 20 is approximately 50 mm.

The location of flexible zones or points can be modified in order to allow the earstem to have desirable bending characteristics. For example, it is contemplated that the flexible zones or points can be spaced at equal lengths along the earstem. Further, it is contemplated that the flexible zones or points can be spaced at increasingly shorter lengths along the earstem. In this manner, the geometry of the earstem can be selectively configured to produce a given shape, deflected position, or bending mode. Various embodiments and illustrations of this principle are shown and described herein.

The above-disclosed ranges of lengths and locations of the flexible zones can be incorporated into various embodiments of the earstem disclosed herein. However, it is contemplated that the number of flexible zones can also be modified by one of skill in the art. Additionally, as discussed herein, the dimensions and material properties of the body or spine and any segment of the earstem can also be selected were modified by one of skill in the art to produce an earstem having desirable flexural and geometric properties.

FIG. 11A is a top cross-sectional view of the earstem 12 shown in the top view of FIG. 10A while in the undeflected position. FIG. 11B is a top cross-sectional view of the earstem 12 shown in the top view of FIG. 10B while in the deflected position. With initial reference to FIG. 11A, the body or spine 34 is attached to the first and second segments 30, 32 at the respective ones of the attachment portions of 100, 140. Notably, the recesses 132, 134, and 102 are provided such that the body or spine 34 can deflect. As discussed above, the surfaces 150, 152, and 110 provide a means for limiting and/or controlling deflection of the body or spine 34.

Referring now to FIG. 11B, the earstem 12 is shown in a deflected position in which the body or spine 34 has deflected. In particular, the body or spine 34 has moved from a generally curved configuration to a straighter configuration. However, it is contemplated that the shape of the body or spine 34 can be modified in either the undeflected or deflected positions. FIG. 11B also illustrates that the body or spine 34 can be at least partially deflected into the recesses of the first and second segments 30, 32. Further, the surfaces 150, 152, and 110 can serve to prevent further deflection and/or control the deflection of the body or spine 34. As illustrated, the body or spine 34 can abut the surfaces 150, 152, and 110 in the deflected position.

The illustrated embodiment of FIGS. 1-19 can also provide a manner of dynamically controlling and/or limiting the motion of the first earstem 12. In this regard, the stiffness of the first earstem 12 can be selectively controlled based on the dimensions and materials used for the joints, elongate body, and segments of the first earstem 12.

For example, in addition to the initial degree of deflection relating to the gap 60, it is also contemplated that the elongate body 34 of the first earstem 12 can permit a further or secondary degree of deflection. In this regard, the elongate body 34 of the first earstem 12 can be formed from an elastic material that allows the portion of the elongate body 34 to be stretched in tension after the first earstem 12 deflects according to the initial degree of deflection corresponding to the size of the recesses, or in some embodiments, the gap between contact surfaces of adjacent segments.

As shown in FIG. 2, a length 62 of the elongate body 34 can be positioned between the mechanical fasteners 40 that attach the segments 30, 32 to the elongate body 34. In some embodiments, the body or spine 34 can be dimensions to control the stiffness of the length 62. In other words, one of skill in the art can take into account the flexural or elastic modulus of the material of the body or spine 34 with the cross-sectional dimensions of the body or spine 34 along the length 62 in order to provide desirable bending characteristics of the elongate body or spine 34 along the length 62. Embodiments wherein the body or spine 34 is fabricated from a metal or composite can be especially benefited by such an analysis.

It is contemplated that the body or spine 34 can be configured such that the length 62 of the elongate body 34 can provide a further or secondary degree of deflection for the first earstem 12. For example, the body or spine 34 can be made of an elastic material such that as the length 62 stretches, thus allowing at least limited further deflection about the flexible zone or point 42. It is therefore contemplated that the material and/or geometry of the elongate body 34 can be selected to provide a desired secondary degree of deflection about the flexible zone or point 42. Therefore, as the length 62 stretches, the force required to cause additional deflection can be dynamically increased.

Referring again to FIGS. 10A-B in accordance with some embodiments, the first segment 30 can comprise the third contact surface 54 and the frame 16 can comprise a fourth contact surface 56. Optionally, it is contemplated that the third and fourth contact surfaces 54, 56 can define a gap 64 that can correspond to an initial or primary degree of deflection at the joint 20. In optional embodiments, the third contact surface 54 can interact with the fourth contact surface 56 to limit and/or control movement of the earstem 12. For example, the third contact surface 54 and the fourth contact surface 56 can abut each other, similar to the optional embodiment disclosed above with respect to the first and second contact surfaces 50, 52, such that the third and fourth contact surfaces 54, 56 can provide stability and further control and/or limit the deflection of the first earstem 12. In this regard, the third and fourth contact surfaces 54, 56 can be arcuately formed. In this manner, the third and fourth contact surfaces 54, 56 can engage each other to not only limit further medial bending of the first earstem 12, but to also limit torsional or vertical bending of the first earstem 12 at the joint 20.

Optionally, in such embodiments, in addition to the initial degree of deflection relating to the gap 64, it is also contemplated that the elongate body 34 of the first earstem 12 can permit a further or secondary degree of deflection at the joint 20. For example, the elongate body 34 of the first earstem 12 can be formed from an elastic material that allows the portion of the elongate body 34 to be stretched in tension after the first earstem 12 deflects according to the initial degree of deflection corresponding to the size of the gap 64. Specifically, as shown in FIG. 2, a length 66 of the elongate body 34 can be positioned between a pin 68 of the joint 20 and the mechanical fastener 40' that attach the segment 32 to the elongate body 34. Accordingly, the length 66 of the elongate body 34 can provide a further or secondary degree of deflection for the first earstem 12 as the length 66 stretches, thus allowing at least limited further deflection about the joint 20. It is therefore contemplated that the material and/or geometry of the elongate body 34 can be selected to provide a desired secondary degree of deflection about the joint 20. Therefore, as the length 66 stretches, the force required to cause additional deflection can be dynamically increased.

As noted above, in embodiments wherein the body or spine 34 is formed from a metal or composite, one of skill in the art can take into account the flexural or elastic modulus of the material of the body or spine 34 with the cross-sectional dimensions of the body or spine 34 along the length 66 in order to provide desirable bending characteristics of the elongate body or spine 34 along the length 62. Embodiments wherein the body or spine 34 is fabricated from a metal or composite can be especially benefited by such an analysis.

As will be appreciated with reference to FIGS. 1-11B, the illustrated embodiment can also provide a manner of progressively controlling and/or limiting the motion of the first earstem 12. In this regard, the stiffness of the first earstem 12 can be selectively controlled based on the dimensions and materials used for the flexural zones, elongate body or spine, and segments of the first earstem 12.

For example, it is contemplated that the earstem can comprise more than two segments. In such embodiments, the earstem can comprise a plurality of flexible zones or points disposed between the segments of the earstem. Optionally, the flexible zones or points of such embodiments could also comprise gaps formed between the segments. In some embodiments, relative movement between adjacent segments can serve to close the gaps, thereby limiting the initial or primary degree of deflection at the zones or points. Optionally, the zones or points can provide a further or secondary degree of deflection relating to tensile bending or stretching of an elastic body or spine.

Moreover, embodiments can be to enable progressive or controlled deflection of the earstem 12. In particular, it is contemplated that one or more recesses formed in a segment attached to the body or spine of the earstem can limit and/or control deflection of the body or spine. Further, in optional aspects, gaps can be formed between the segments of the earstem and selectively dimensioned in order to allow progressive deflection of the earstem.

For example, in an embodiment wherein the earstem has first, second and third flexible zones or points, the earstem could begin deflecting at the first zone or point prior to deflection of the second and third zones or points. In particular, it may be beneficial to allow the anterior or first zone or point to deflect initially when the first zone or point is disposed anteriorly relative to the second and third zones or points. Subsequent to the deflection at the first zone or point, the second zone or point can begin deflecting. Then, subsequent to deflection at the second zone or point, the third zone or point can begin deflecting. Thus, the earstem can be configured such that each zone or point at least partially deflects prior to deflection of a subsequent zone or point. In some embodiments, deflection at a given zone or point may be completed prior to the beginning of deflection at the subsequent zone or point. In other words, the earstem can reach maximum deflection at the first zone or point before beginning to deflect at the second zone or point, and the earstem can then reach maximum deflection at the second joint before beginning to deflect at the third zone or point. As such, various embodiments of the earstem disclosed herein can not only provide progressive deflection, but can provide partial or complete progressive deflection.

Nevertheless, it is contemplated that in some embodiments, the flexible zones or points of the earstem can provide proportional and/or simultaneous deflection.

With further reference to the embodiment shown in FIGS. 1-19, the segments 30, 32 can be configured as rigid components of the first earstem 12. However, it is contemplated in some embodiments, that one or more segments can be flexible, and can provide dynamic deflection of the earstem based on the segment geometry and material.

Further, as shown in the illustrated embodiment of FIGS. 1-19, the segments 30, 32 can be formed separately from the elongate body 34 of the first earstem 12, and the segments 30, 32 can be generally rigid components that are attached to a relatively flexible elongate body 34. However, embodiments are contemplated in which the segments are formed monolithically with the earstem, spaces, joints, or gaps between the segments and the frame and/or the remainder of the first earstem can be dimensioned in order to provide flexibility relative to the segments.

Even in such diverse embodiments, the earstem can comprise a variable or constant stiffness along its length and/or one or more deflection modes. For example, in a first deflection mode, the elongate body can bend at spaces, joints, or gaps between the segments and the frame and/or the remainder of the earstem. Further, in some embodiments, in a second deflection mode, the elongate body can be stretched or deformed in tension. Furthermore, in some embodiments, in a third deflection mode, these segments can be deflected themselves in order to allow a further degree of deflection of the first earstem. The stiffness of the earstem can vary along the length thereof, at given zones or points, in order to modify the deflection mode, including the progression of deflection.

Figure 12:
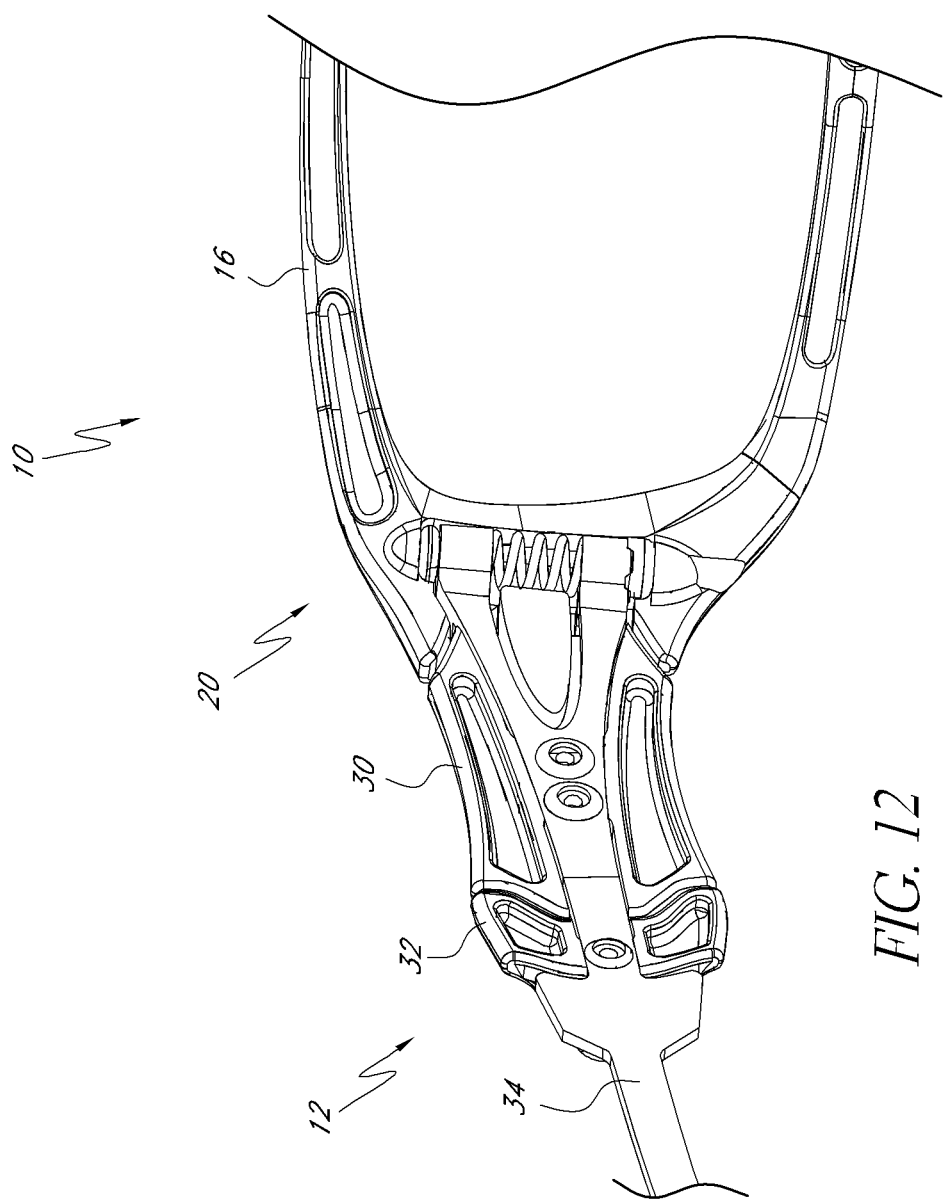
FIG. 12 is a perspective view of an interior side and hinge joint of the eyeglass shown in FIG. 1.
Figure 13:
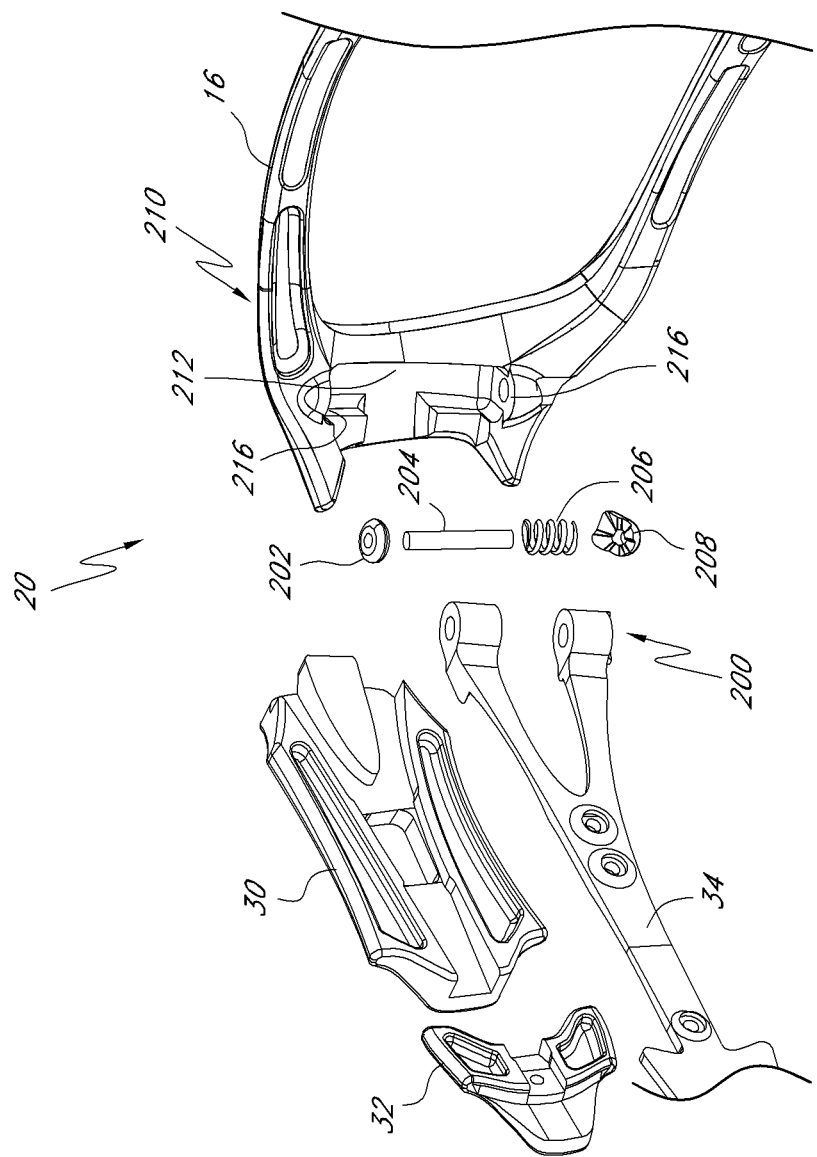
FIG. 13 is an exploded perspective view of the interior side and hinge joint of the eyeglass shown in FIG. 1.

Referring now to FIG. 12, a perspective view of an interior portion of the assembled earstem 12 and eyeglass 10 are shown. Further, FIG. 13 illustrates, in perspective, and exploded view of the joint 20 of the eyeglass 10. As illustrated and discussed below, the joint 20 can be configured to comprise a cam-assist closure mechanism.

As shown in FIG. 13, the joint 20 can be formed from an anterior portion or end 200 of the body or spine 34, a washer 202, and elongate pin 204, a spring 206, and a cam member 208. These components can be received or mounted at a lateral side 210 of the frame 16. In particular, the frame 16 can comprise a recessed area 212 having upper and lower components 214, 216 that can engage to pin 204 in order to retain the above-noted components and thereby form the joint 20.

One of the unique aspects of embodiments of the joint 20 is that the joint can comprise a cam-assist closure mechanism. In this regard, the cam-assist closure mechanism can comprise one or more protrusions formed on the anterior portion 200 of the body or spine 34 that can interact with the cam member 208.

Figure 14:
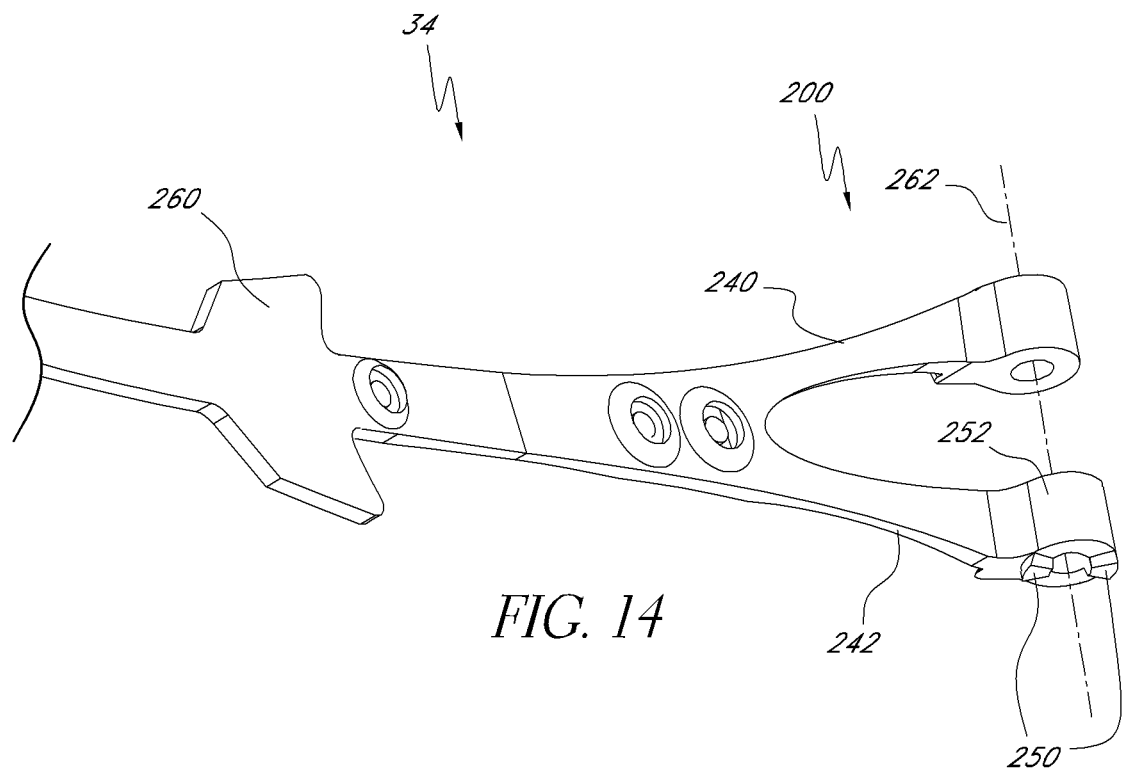
FIG. 14 is a bottom perspective view of an elongated body or spine of the earstem, according to an embodiment.

For example, with reference to FIG. 14, the anterior portion 200 of the elongate body or spine 34 can comprise upper and lower fork members 240, 242. In some embodiments, is one of the fork members 240, 242 can comprise a projection or recess that can be configured to interact with the cam member

208. As illustrated in FIG. 14, the lower fork member 242 can comprise a pair of projections 250 that extend downwardly from a pin mounting component 252 of the lower fork member 242.

Figure 15:
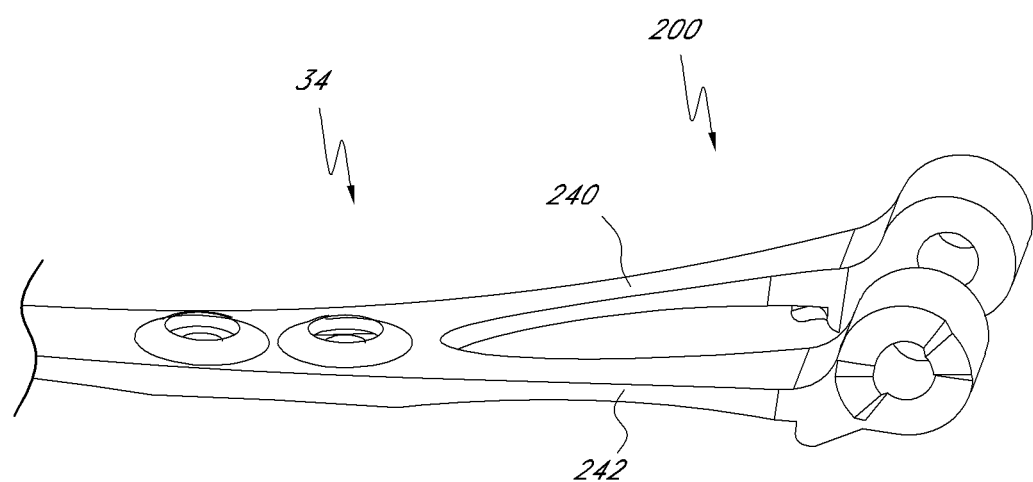
FIG. 15 is another bottom perspective view of the elongated body or spine shown in FIG. 14.

Additionally, as discussed above, the body or spine 34 can define a variable cross-sectional profile in order to provide a given stiffness at a given point along the length of the body or spine 34. In the embodiment illustrated in FIGS. 14-15, the dimensions of the body or spine 34 can vary in width or thickness. For example, FIG. 14 illustrates that the body or spine 34 can have a width that varies along the length thereof. Notably, the body or spine 34 can comprise an area or zone 260 of increased stiffness which is formed by increasing the width of the body or spine 34 in that area 260. Moreover, FIG. 15 illustrates that the thickness of the body or spine 34 can be varied as well. For example, the thickness of the body or spine 34 along the anterior portion 200 thereof is reduced compared to the thickness of the body or spine 34 in other areas thereof. In this regard, the stiffness at any given point along the anterior portion 200 of the body or spine 34 will be a summation of the stiffnesses of the individual upper and lower fork members 240, 242. Accordingly, in order to provide it desirable flexural properties, the thickness and/or width of the body or spine 34 can be varied in various embodiments.

One of the unique aspects of some embodiments disclosed herein is that the fork-shaped anterior portion 200 of the body or spine 34 can also contribute to a self-opening or self-closing mechanism of the eyeglass 10. In some embodiments, this feature can be provided in combination with the cam-assist closure mechanism. In this regard, the upper and lower fork members 240, 242 can be configured to resist compressive forces that would cause the upper and lower fork members 240, 242 to converge towards each other. In order to provide such compressive forces, the cam member 208 can interact with the upper and lower fork members 240, 242 to cause axial movement of the fork members 240, 242 as the body or spine 34 is rotated about an axis 262 defined by the joint 20, and more specifically, the pin 204.

For example, as illustrated in FIGS. 16-17, the cam member 208 can comprise one or more recesses 280 and one or more raised portions 282 formed along an upper surface 284 of the cam member 208. In particular, some embodiments can comprise a plurality of recesses 280 that are spaced between a plurality of raised portions 282. Nevertheless, it is contemplated that embodiments can be provided which include either a pair of protrusions and a recess or a pair of recesses and a protrusion. In this regard, the function of the recess and the protrusion is to urge a corresponding protrusion or recess formed on the anterior portion 200 of the body or spine 34 toward a given rotational rest position.

Thus, the number of recesses and protrusions formed in the cam member can determine the number of rotational rest positions. In use, the cam member 208 and the body or spine 34 can interact to create rotational rest positions. For example, if the body or spine 34 comprises a protrusion that engages the cam member 208, the protrusion of the body or spine 34 will tend to be axially urged into a corresponding recess of the cam member 208. Similarly, if the body or spine 34 comprises a recess that engages the cam member 208, the recess of the body or spine 34 will tend to be axially urged to receive a corresponding protrusion of the cam member 208. In either configuration, a rest position is achieved when the body or spine 34 is rotationally aligned with the cam member 208. Thus, in some embodiments, a first rotational rest position can be achieved when the earstem is in a fully deployed position, and a second rotational rest position can be achieved when the earstem is in a stowed position in which the earstem is disposed adjacent to the frame of the eyeglass.

Continuing, the earstem 12 can be urged to one of the first and second rotational rest positions due to the spacing and mounting of the body or spine 34 and the cam member 208 between the upper and lower components 214, 216 of the recessed area 212 of the frame 16. Specifically, during rotation, the earstem 12 is biased to one of the first and second rotational rest positions due to the propensity of the upper and lower fork members 240, 242 to resist a axial compression or deflection, along with the forced axial compression or deflection caused to the upper and lower fork members 240, 242 as the pin mounting component 252 as the protrusions 250 pass over the raised protrusions 282 of the cam member 208. In this manner, the eyeglass 10 can provide an effective manner of maintaining the ear stands in one of the open and closed positions.

Optionally, it is contemplated that in some embodiments, the spring 206 can be used as an assist member to further urge the upper and lower fork members 240, 242 apart such that the earstem 12 is biased towards one of the first and second rotational rest positions. In this regard, the spring 206 could be configured to extend between the upper and lower fork members 240, 242. In some embodiments, the spring 206 can make direct contact with the upper and lower fork members 240, 242. Further, in some embodiments, the spring 206 can be disposed about the axis 262 of rotation of the earstem 12. For example, the spring 206 can be passed over the elongate pin 204.

Figure 20:
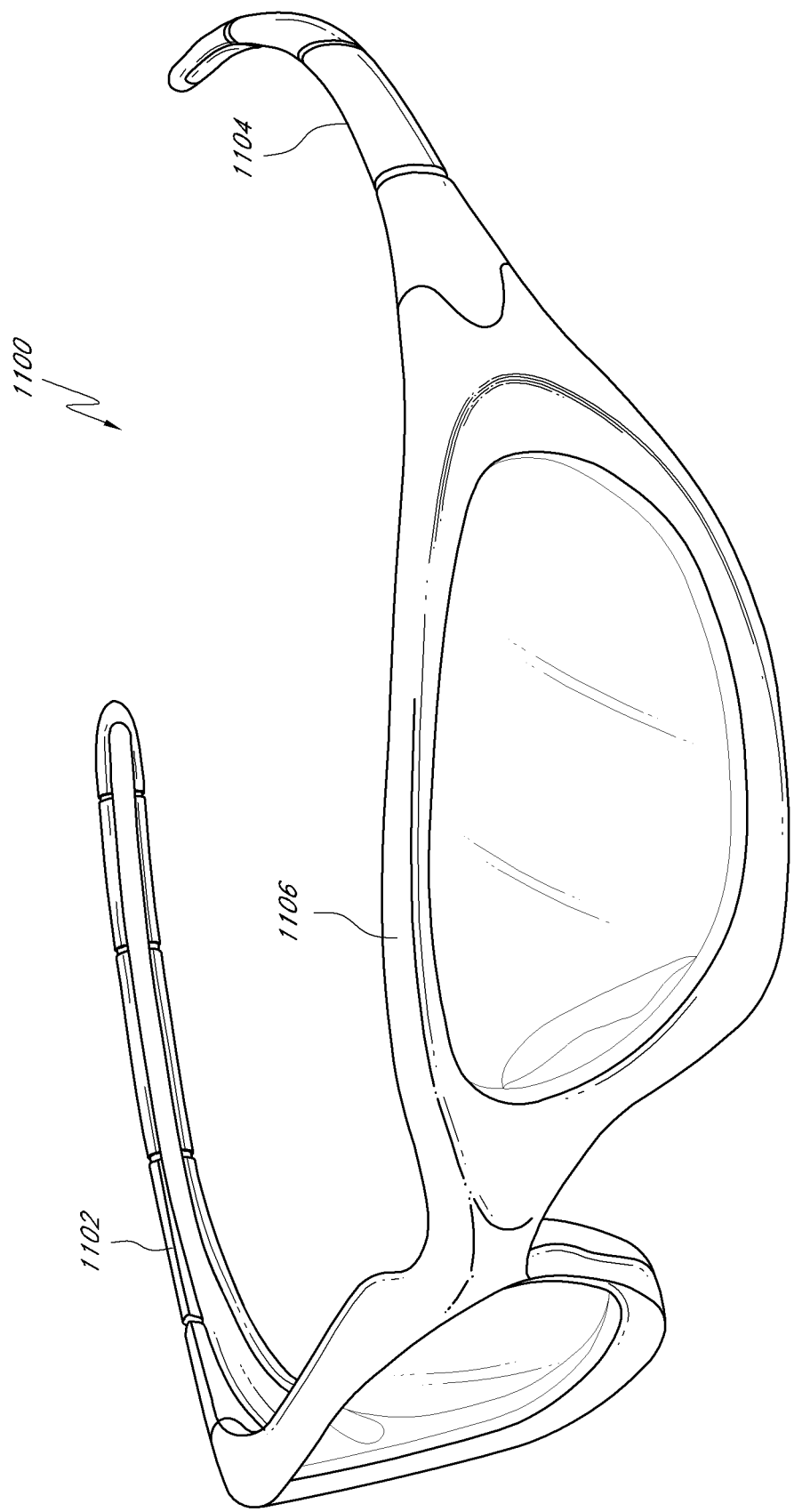
FIG. 20 is a perspective view of another eyeglass in accordance with another embodiment.
Figure 21:
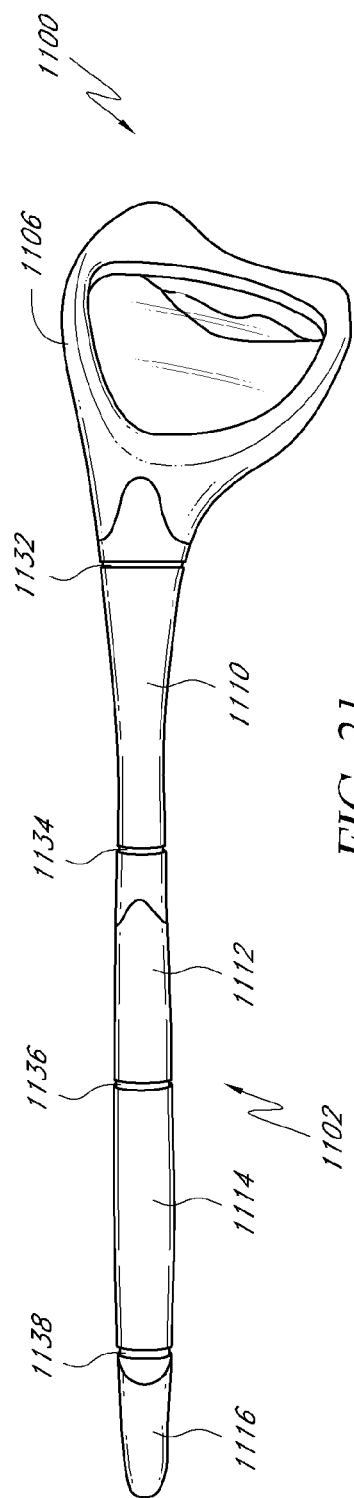
FIG. 21 is a left side view of an earstem of the eyeglass of FIG. 20.
Figure 22:
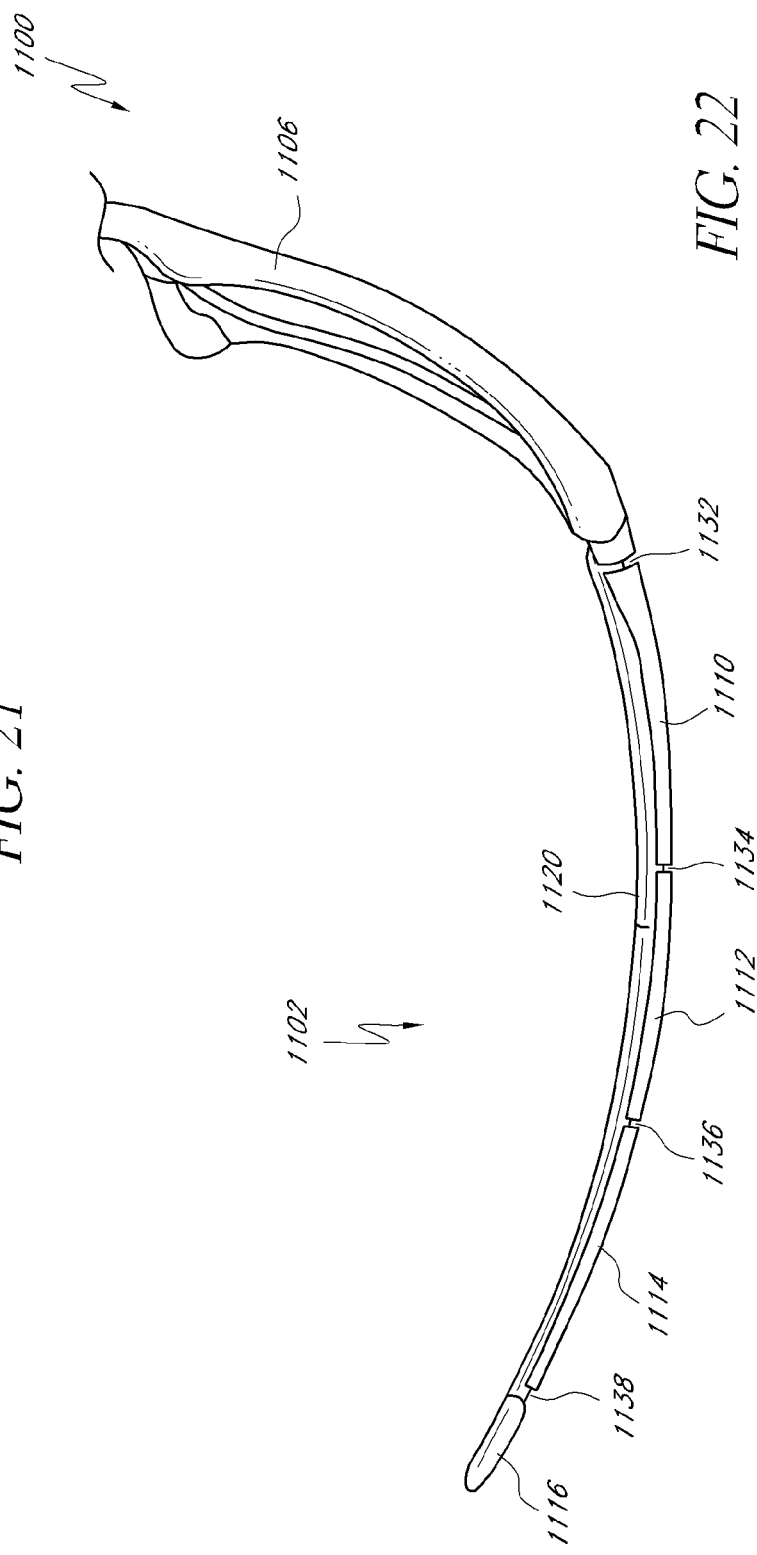
FIG. 22 is a top view of the earstem shown in FIG. 21.

Referring now to FIGS. 20-22, another embodiment of an eyeglass and earstem combination are shown. FIG. 20 illustrates an eyeglass 1100 having a first earstem 1102, a second earstem 1104, and a frame 1106. As shown in FIG. 21, the first earstem 1102 can comprise a plurality of segments 1110, 1112, 1114, 1116. These segments 1110, 1112, 1114, 1116 can be monolithically formed along an elongate body 1120 or backbone of the first earstem 1102. Accordingly, in such an embodiment, the segments 1110, 1112, 1114, 1116 and the frame 1106 can form a plurality of joints 1132, 1134, 1136, 1138 where at the first earstem 1102 can bend.

Similar to the embodiment discussed above with reference to FIGS. 1-19, the earstem 1102 can be uniquely configured to optimize the distance along the first earstem 1102 of the joints 1132, 1134, 1136, 1138. Further, the spacing or gaps between the segments 1110, 1112, 1114, 1116 and the frame 1106 can also be optimized in order to limit and/or control bending of the first earstem 1102.

Additionally, it is noted that the geometry of the first earstem 1102 at each of the joints 1132, 1134, 1136, 1138 can be selected such that variable or progressive bending occurs along the earstem 1102. As illustrated, the joint 1132 can provide a wider cross-section, thus providing more limited movement and greater stiffness than the joint 1134 which provides a narrower cross-section. In this regard, the stiffness of the first earstem 1102 can be selectively controlled based on the dimensions and materials used for the joints, elongate body, and segments of the first earstem 1102.

Figure 23:
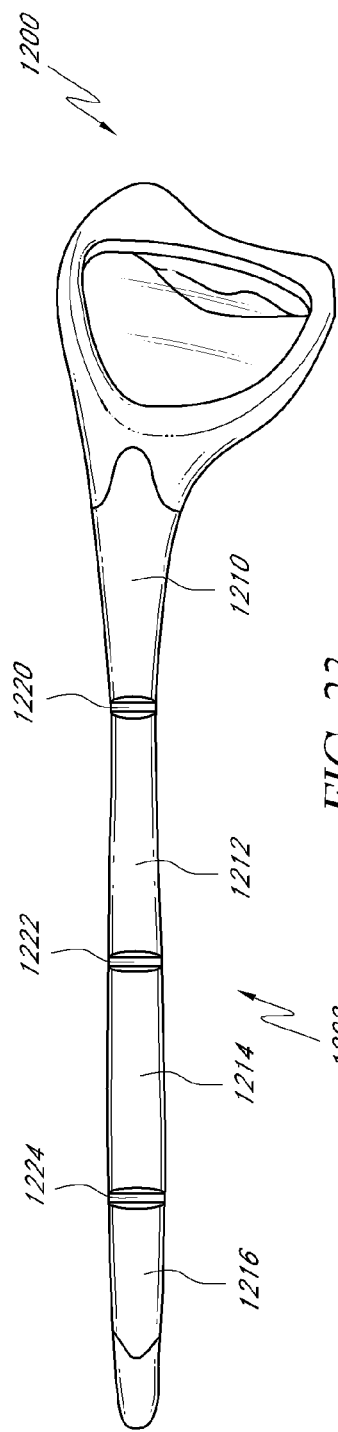
FIG. 23 is a left side view of an earstem, according to another embodiment.
Figure 24:
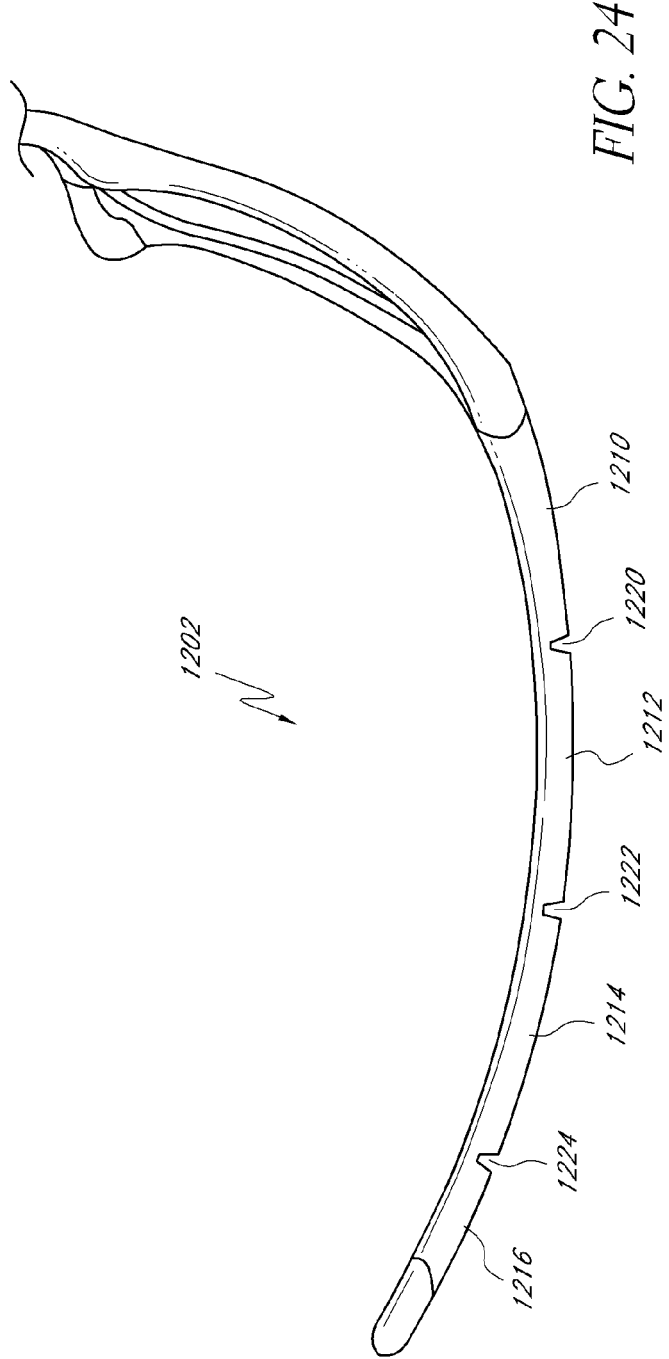
FIG. 24 is a top view of the earstem shown in FIG. 23.

FIGS. 23-24 illustrate another embodiment of an eyeglass and earstem combination. As illustrated, an eyeglass 1200 can be provided that comprises a first earstem 1202 that is formed to include a plurality of segments 1210, 1212, 1214, 1216. In this embodiment, the earstem 1202 comprises three flexible joints 1220, 1222, 1224. The flexible joints 1220, 1222, 1224 can be disposed at approximately equal distances along the length of the earstem 1202. Further, in such an embodiment, the segments 1210, 1212, 1214, 1216 can be formed monolithically with the earstem 1202. As such, each joint 1220, 1222, 1224 can comprise a narrowed section of the earstem 1202 that is relatively more flexible than the segments 1210, 1212, 1214, 1216 thereof. Moreover, similar to the embodiments discussed above with reference to FIGS. 1-22, the earstem 1202 can be configured to progressively deflect, provide controlled deflection to a given deflected position, allow deflection within a given range, as well as the other features discussed above.

Figure 25:
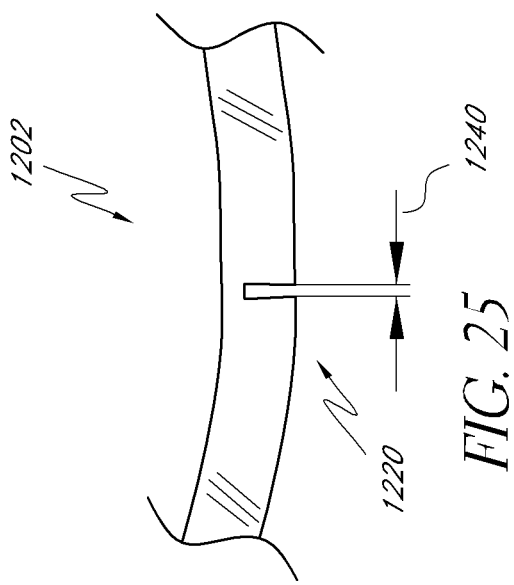
FIG. 25 is a top view a joint of an earstem wherein the joint is in an undeflected position, according to an embodiment.
Figure 26:
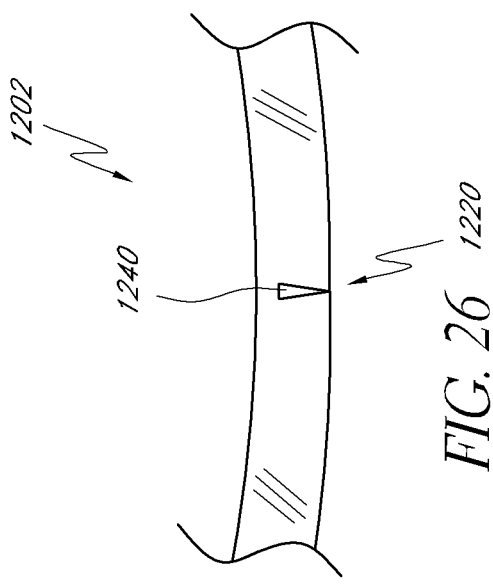
FIG. 26 is a top view of the joint shown in FIG. 25 wherein the joint is in a deflected position.

For example, as illustrated in the top views of FIGS. 25 and 26, the joint 1220 of the earstem 1202 can comprise a gap 240 that narrows until closing or bottoming out, thus limiting the deflection of the earstem 1202 at the joint 1220. FIG. 25 illustrates the joint 1220 prior to deflection, while FIG. 26 illustrates the joint 1220 subsequent to deflection.

Figure 27:
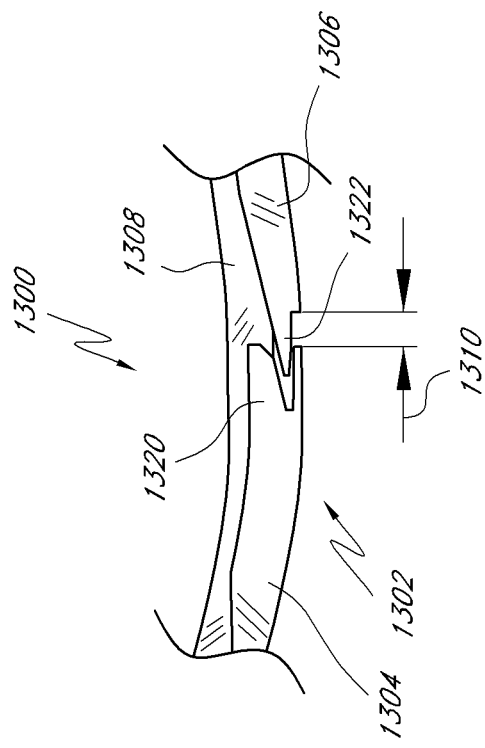
FIG. 27 is a top view another joint of an earstem wherein the joint is in an undeflected position, according to another embodiment.
Figure 28:
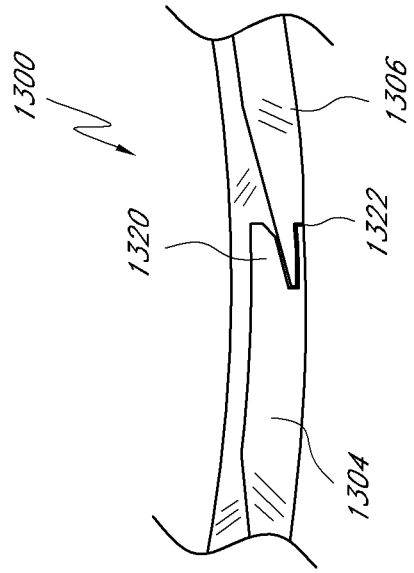
FIG. 28 is a top view of the joint shown in FIG. 27 wherein the joint is in a deflected position.

In accordance with an embodiment of another joint, FIGS. 27-28 illustrate an earstem 1300 having a joint 1302 formed between adjacent segments 1304, 1306. These segments 1304, 1306 are attached to an elongate body or backbone 1308. As such, the joint 302 illustrated in FIGS. 27 and 28 is similar to the embodiment illustrated in FIGS. 10A-B. Accordingly, as the earstem 1300 deflects, the segments 1304, 1306 can contact each other to limit and/or control deflection of the earstem 1300. As in FIGS. 25-26, a gap of 1310 formed between the segments 1304, 1306 can narrow until closing or bottoming out when the earstem 1300 moves from an undeflected position in FIG. 27 to a deflected position in FIG. 28.

One of the unique aspects of the embodiment illustrated in FIGS. 27-28 is the lateral overlap of the segments 1304, 1306 adjacent to the gap 1310. In this regard, an end 1320 of the segment 1304 can be positioned adjacent to an end 1322 of the segment 1306. When the earstem 1300 is deflected as shown in FIG. 28, the ends 1320, 1322 can form an interlocking joint that provides rigidity and stability for the joint 1302. In such embodiments, the ends 1320, 1322 can comprise complementary interlocking features that engage each other during deflection of the earstem 1300.

In accordance with yet another embodiment, FIGS. 29-30 illustrate an eyeglass 1400 having an earstem 1402 that is coupled to a frame 1404. As discussed above, the earstem 1402 can comprise many of the features and advantages provided and disguised with regard to the embodiments shown in FIGS. 1-28. However, the embodiment illustrated in FIGS. 29-30 is unique in that the earstem 1402 comprises a plurality of segments 1410, 1412, 1414 that are comolded within the earstem 1402. The segments 1410, 1412, 1414 can comprise a material that is different from the molded material forming the remainder of the earstem 1402. As such, the earstem 1402 can comprise a plurality of joints 1420, 1422, 1424 at which the earstem 1402 has a reduced stiffness relative to areas of the earstem along which the segments 1410, 1412, 1414 extend. Similar to the embodiments discussed above, the cross-sectional dimension of the earstem 1402 can be selected so as to provide a desired degree of stiffness at each of the respective joints.

FIGS. 31 and 32 illustrate yet another embodiment of an eyeglass and earstem combination. As illustrated, and eyeglass 1500 can comprise an earstem 1502 that is coupled to a frame 1504. The earstem 1502 provides a various similar features and functional attributes as the embodiments discussed and illustrated with reference to FIGS. 1-30. In the embodiment of FIGS. 31 and 32 however, the earstem 502 comprises a plurality of segments 1510, 1512, 1514, 1516 that are interconnected in an end-to-end manner using discrete interconnector components or bodies 1520, 1522, 1524.

In accordance with some embodiments, the interconnector bodies of 1520, 1522, 1524 can comprise springs or other resilience elements that allow motion between the segments 1510, 1512, 1514, 1516. Similar to the embodiments discussed herein, the interconnector bodies 1520, 1522, 1524 can form joints of the earstem 1502. In this regard, the individual interconnector bodies 1520, 1522, 1524 can each have different stiffnesses such that the joints between the segments 1510, 1512, 1514, 1516 provide progressive deflection. Further, as also noted above with respect to the other embodiments disclosed herein, each of the segments 1510, 1512, 1514, 1516 can provide a secondary degree of deflection in addition to the initial or primary degree of deflection of the interconnector bodies 1520, 1522, 1524.

Furthermore, in accordance with any of the embodiments disclosed or showed herein, it is contemplated that the design of a given flex zone or point should also consider the yield stress of the component or ear stem. In this regard, it would be undesirable to exert a bending stress on the ear stem or one of its components which exceeds the yield stress of the ear stem or component. In such situations, deflection or de-formation of the ear stem or component would become inelastic.

Nevertheless, it is contemplated that certain portions of the earstem, such as the elongate body or spine can be formed of a material that is bendable to a given shape while retaining elastic properties. In this regard, it is contemplated that the posterior half or posterior portion of the elongate body or spine can be bended by the wearer in order to further customize the fit of the eyeglass.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An enhanced performance earstem for eyeglasses, comprising:
   an elongate body, having an anterior end and a posterior end; and
   at least a first segment and a second segment on the body, separated by a flex zone or point, wherein the elongate body is configured to deflect relative to at least a portion of one of the first and second segments, and wherein at least one of the first and second segments comprises a recess formed on an inner side surface of the segment, wherein the inner side surface is configured to extend from an anterior end to a posterior end of the segment and face substantially towards a head of a wearer when the eyeglasses are worn by the wearer, the recess configured to receive at least a portion of the elongate body for allowing deflection of the elongate body into the recess of the respective one of the first and second segments;

wherein a center of the flex zone or point is within the range of from about 20 mm to about 70 mm from the anterior end of the elongate body.

2. An enhanced performance earstem as in claim 1, wherein the first segment and the second segment are separated at the flex zone or point by a first gap, and wherein deflection of the earstem at the flex zone or point changes a width of the first gap.

3. An enhanced performance earstem as in claim 2, wherein deflection of the earstem is operative to reduce the first gap such that the first segment and the second segment contact each other to prevent further deflection of the earstem.

4. An enhanced performance earstem as in claim 3, wherein the earstem is operative to deflect at the flex zone or point until the first segment contacts the second segment.

5. An enhanced performance earstem as in claim 4, wherein the first gap separates the first segment and the second segment such that the first segment and the second segment do not touch when the earstem is in an undeflected position.

6. An enhanced performance earstem as in claim 1, wherein the recess comprises a contact surface configured to at least partially abut the elongate body for constraining deflection of the elongate body.

7. An enhanced performance earstem as in claim 1, further comprising another flex zone or point, the other flex zone or point disposed between about 30 mm to about 70 mm from the anterior end.

8. An enhanced performance earstem as in claim 7, wherein the other flex zone or point comprises the posterior end of the elongate body of the earstem.

9. An enhanced performance earstem as in claim 1, wherein the first segment and the second segment are disposed externally along the elongate body.

10. An enhanced performance earstem as in claim 1, wherein the first segment and the second segment are formed separately from and coupled to the elongate body of the earstem.

11. An enhanced performance earstem as in claim 1, wherein the first segment and the second segment are generally rigid relative to the elongate body.

12. An earstem having differential flexibility, comprising:
a flexible, elongate body having an anterior end and a posterior end, the body having a plurality of relatively flexible zones, each flexible zone separated from an adjacent flexible zone by a relatively rigid zone;
wherein the relatively flexible zones have different stiffnesses.

13. An earstem as in claim 12, wherein a stiffness of a first relatively flexible zone is greater than a stiffness of a second relatively flexible zone to provide progressive deflection of the earstem upon exertion of bending stress on the earstem.

14. An earstem as in claim 13, wherein the first relatively flexible zone is disposed anteriorly relative to the second relatively flexible zone.

15. An earstem as in claim 12, wherein a first relatively flexible zone finishes deflecting before a second relatively flexible zone finishes deflecting.

16. An earstem as in claim 12, further comprising at least one segment attached to the elongate body, the segment configured to constrain deflection of the elongate body along at least a portion of the elongate body to form the relatively rigid zone.

17. An eyeglass for providing enhanced retention on the head of a wearer, the eyeglass comprising:
a frame for supporting at least one lens in the wearer's field of view;
a pair of earstems attached to the frame for supporting the frame on the head of the wearer, each earstem comprising at least first and second flex zones or points whereat the earstems can bend, the first flex zone or point providing a first degree of deflection, the second flex zone or point providing a second degree of deflection;
wherein the earstems each comprise a plurality of removably attachable rigid segments with at least one rigid segment extending generally between the first flex zone or point and the second flex zone or point of each earstem,
wherein the first degree of deflection is different from the second degree of deflection such that the earstems provide progressive bending along a longitudinal axis of the earstems for providing a secure and conforming fit over a range of head sizes.

18. An eyeglass as in claim 17, wherein the first degree of deflection defines a stiffness of the first flex zone or point and the second degree of deflection defines a stiffness of the second flex zone or point.

19. An eyeglass as in claim 17, wherein the first degree of deflection defines a maximum deflection of the earstem about the first flex zone or point and the second degree of deflection defines a maximum deflection of the earstem about the second flex zone or point.

20. An eyeglass as in claim 19, wherein the plurality of rigid segments are interconnected at the first and second flex zones or points, the maximum deflection of the earstem at a given flex zone or point limited by physical contact of adjacent segments at the given flex zone or point during deflection of the earstem at the given flex zone or point.

21. An eyeglass as in claim 17, wherein the rigid segments comprise contact surfaces that are disposed adjacent to each other at the first and second flex zones or points, each earstem configured such that deflection of the earstem is limited upon abutment of the contact surfaces of the adjacent segments.

* * * * *

UNITED STATES PATENT AND TRADEMARK OFFICE
CERTIFICATE OF CORRECTION

PATENT NO.        : 8,444,265 B2
APPLICATION NO.   : 12/572881
DATED             : May 21, 2013
INVENTOR(S)       : Yee et al.

It is certified that error appears in the above-identified patent and that said Letters Patent is hereby corrected as shown below:

In the Specifications

In column 5 at line 18, Change "body" to --body.--.

In column 12 at line 21, Change "a the" to --the--.

Signed and Sealed this
Twenty-fourth Day of December, 2013

Margaret A. Focarino
*Commissioner for Patents of the United States Patent and Trademark Office*